(12) United States Patent
Poss et al.

(10) Patent No.: US 9,352,887 B2
(45) Date of Patent: May 31, 2016

(54) ELECTRICALLY-POWERED PROGRAMMABLE WASTE ENCLOSURE

(75) Inventors: James Andrew Poss, Bainbridge Island, WA (US); Jeffrey T. Satwicz, Boston, MA (US); David J. Skocypec, Medfield, MA (US)

(73) Assignee: Big Belly Solar, Inc., Newton, MA (US)

( * ) Notice: Subject to any disclaimer, the term of this patent is extended or adjusted under 35 U.S.C. 154(b) by 420 days.

(21) Appl. No.: 13/812,173

(22) PCT Filed: Jul. 21, 2011

(86) PCT No.: PCT/US2011/044855
§ 371 (c)(1),
(2), (4) Date: Mar. 7, 2013

(87) PCT Pub. No.: WO2012/015664
PCT Pub. Date: Feb. 2, 2012

(65) Prior Publication Data
US 2013/0278067 A1    Oct. 24, 2013

Related U.S. Application Data

(60) Provisional application No. 61/368,392, filed on Jul. 28, 2010.

(51) Int. Cl.
*B65D 55/00* (2006.01)
*B65F 1/00* (2006.01)
(Continued)

(52) U.S. Cl.
CPC .............. *B65D 55/00* (2013.01); *B65F 1/0033* (2013.01); *B65F 1/1426* (2013.01); *B65F 1/1468* (2013.01); *H02J 9/00* (2013.01); *B65F 2210/108* (2013.01); *B65F 2210/1121* (2013.01);
(Continued)

(58) Field of Classification Search
CPC ....................................................... G05B 11/00
USPC .......................................................... 307/18
See application file for complete search history.

(56) References Cited

U.S. PATENT DOCUMENTS 5,377,906 A    1/1995    Mason
5,387,858 A *  2/1995    Bender et al. ................. 320/101
(Continued)

FOREIGN PATENT DOCUMENTS

EP    0899215 A1    3/1999
EP    20318149 U1   4/2004
(Continued)

OTHER PUBLICATIONS

EP Application No. 11812969.1 Supplementary European Search Report dated Nov. 14, 2014.
(Continued)

*Primary Examiner* — Robert Deberadinis

(57) ABSTRACT

This invention is directed towards a waste enclosure device ("device") comprising a waste enclosure employing operational functions including collection and monitoring capacity wherein said device includes one or more programmable logic controllers. Operational functions are performed by electrical components including sensors to determine waste deposits characteristics and contents. Said device operational functions are further adapted to send and receive data, optionally wirelessly, and configured and adapted to utilize solar derived electric power and, optionally, electric power from other sources.

18 Claims, 15 Drawing Sheets

(51) Int. Cl.
  *B65F 1/14* (2006.01)
  *H02J 9/00* (2006.01)
  *G05B 11/00* (2006.01)

(52) U.S. Cl.
  CPC ..... *B65F2210/128* (2013.01); *B65F 2210/148* (2013.01); *B65F 2210/1443* (2013.01); *B65F 2210/16* (2013.01); *B65F 2210/168* (2013.01); *B65F 2210/172* (2013.01); *B65F 2220/104* (2013.01); *Y02W 30/10* (2015.05); *Y10T 307/50* (2015.04); *Y10T 307/604* (2015.04); *Y10T 307/625* (2015.04)

(56) References Cited

U.S. PATENT DOCUMENTS

| | | | |
|---|---|---|---|
| 5,690,025 | A | 11/1997 | Hawkins |
| 6,788,924 | B1 | 9/2004 | Knutson et al. |
| 2002/0056377 | A1 | 5/2002 | Gawley et al. |
| 2002/0094799 | A1 | 7/2002 | Elliott et al. |
| 2006/0196874 | A1 | 9/2006 | Yang |
| 2007/0101875 | A1 | 5/2007 | Poss et al. |
| 2007/0209529 | A1* | 9/2007 | Poss et al. ........... 100/43 |
| 2008/0067227 | A1 | 3/2008 | Poss et al. |
| 2008/0084305 | A1 | 4/2008 | Arnold |

FOREIGN PATENT DOCUMENTS

| | | |
|---|---|---|
| EP | 1508535 A1 | 2/2005 |
| WO | WO 2007101301 A1 | 9/2007 |

OTHER PUBLICATIONS

International Application No. PCT/US2011/044855 Search Report and Written Opinion dated Dec. 14, 2011.

* cited by examiner

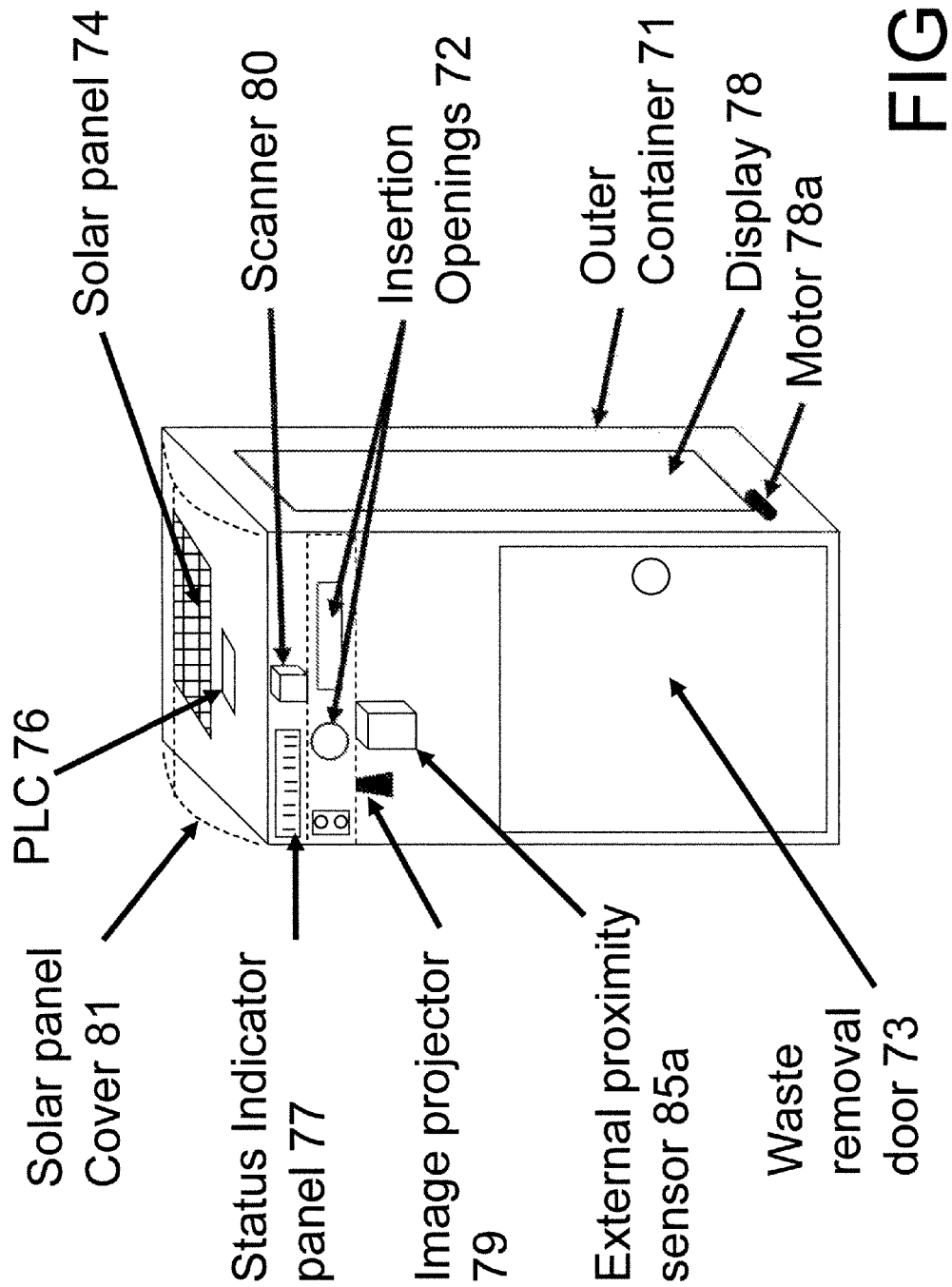

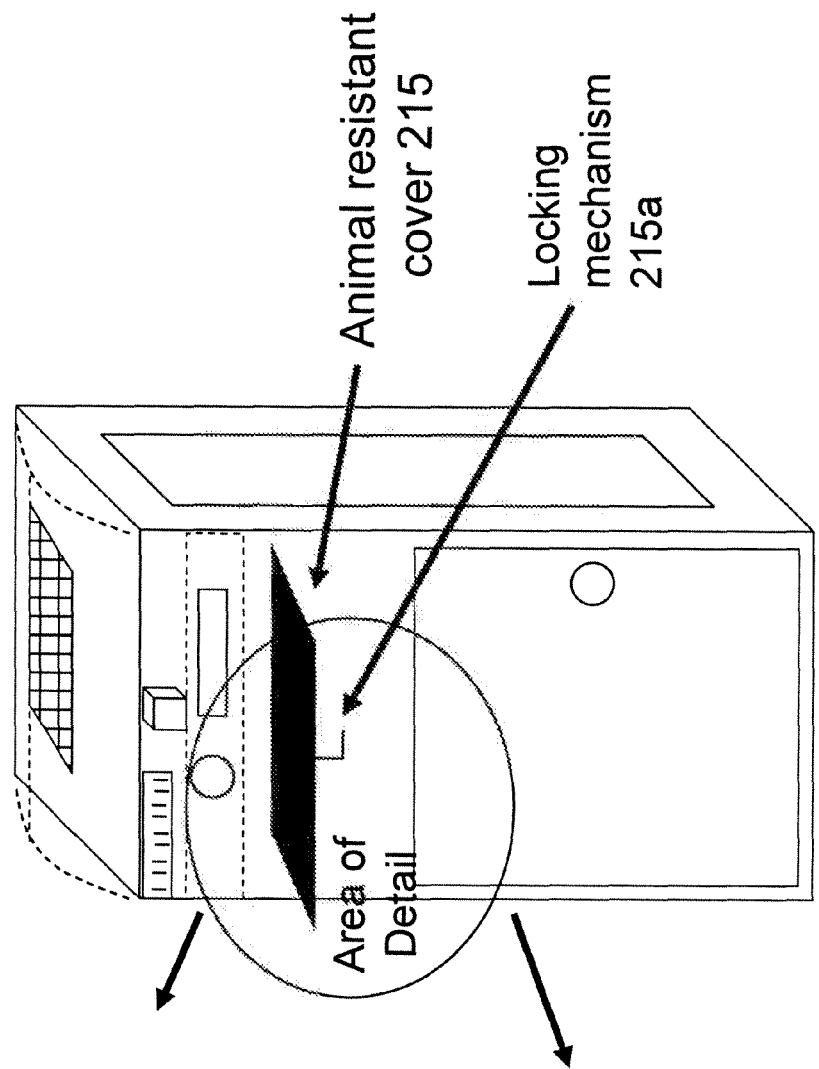
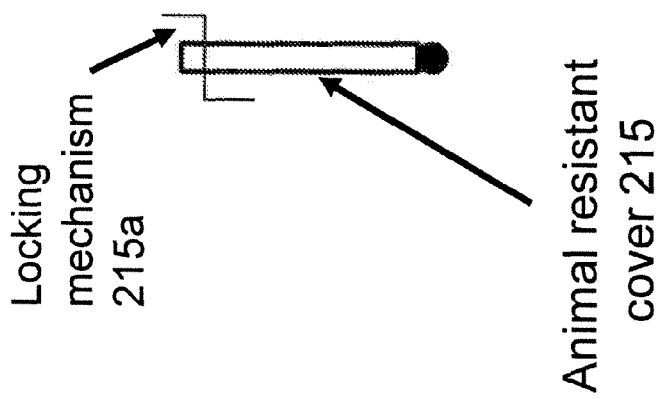
FIG 1c

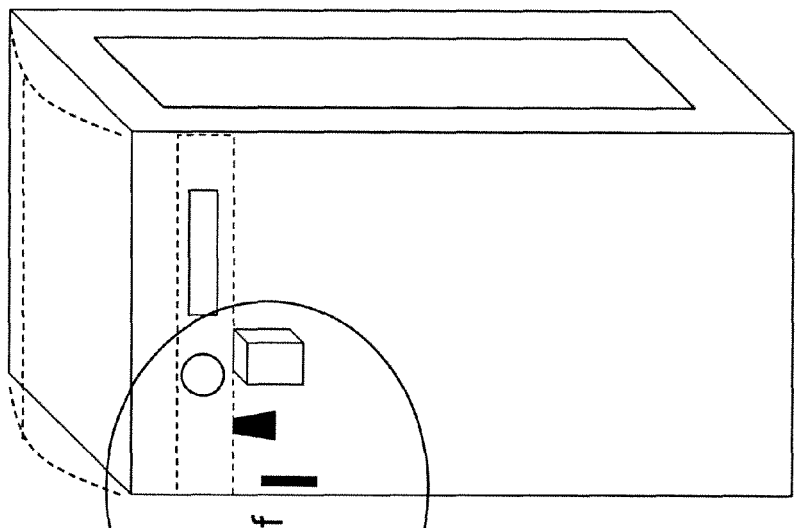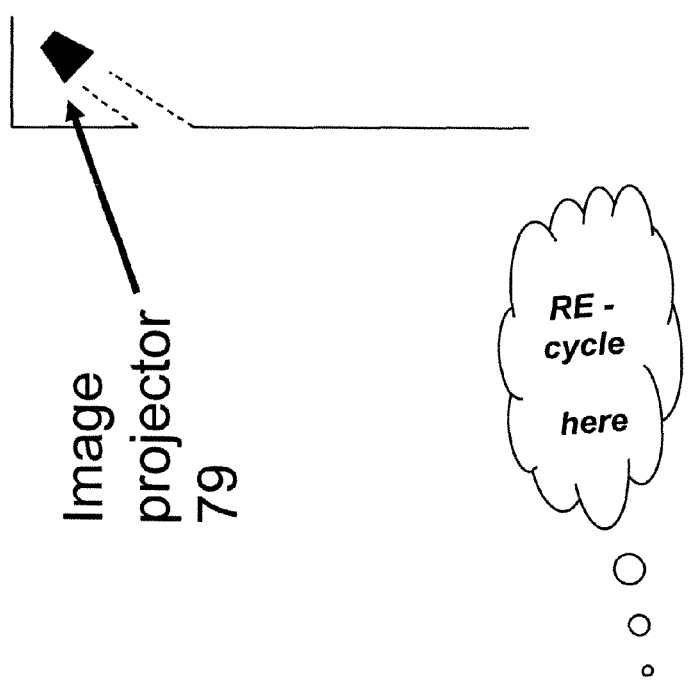
FIG 1e

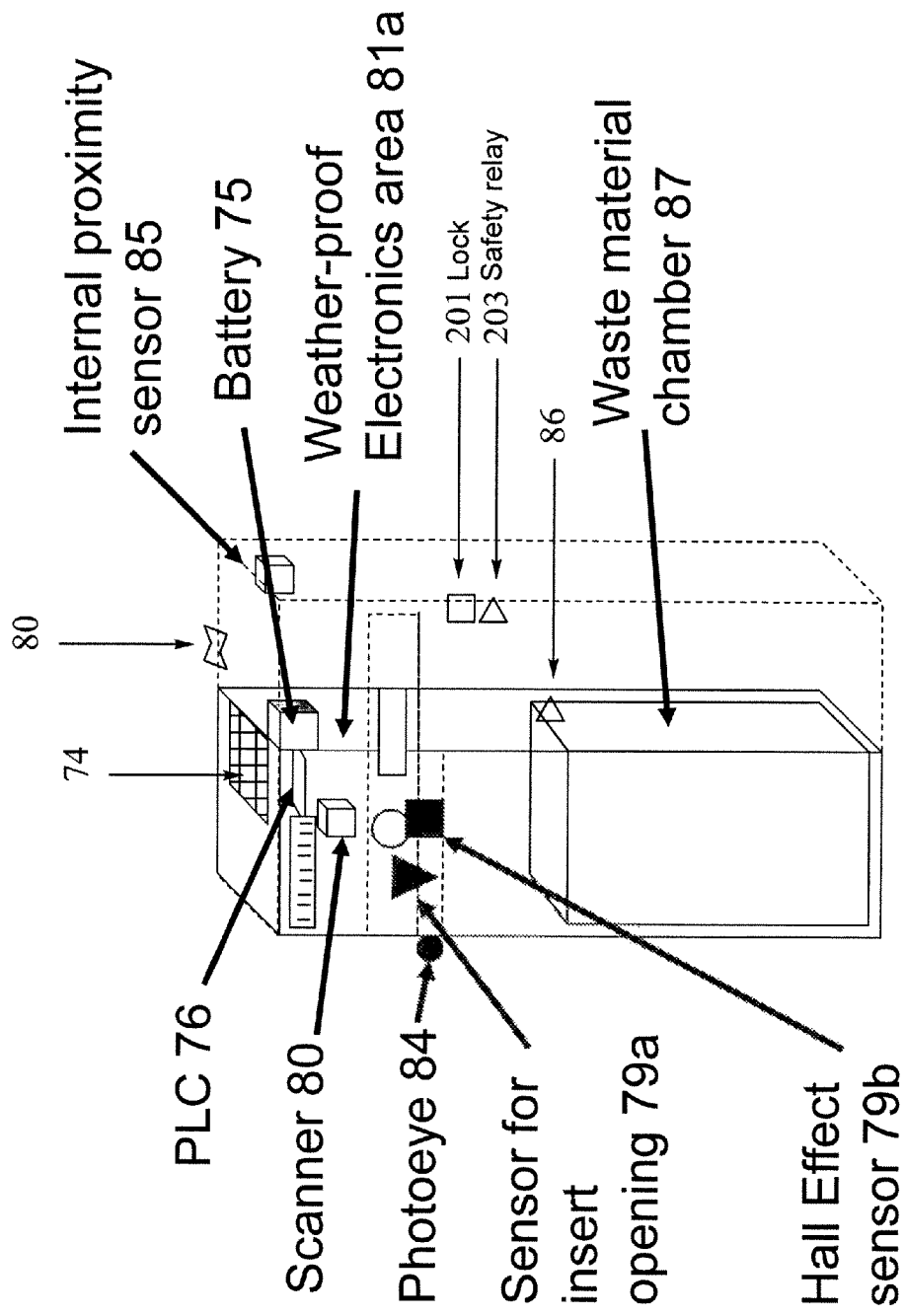

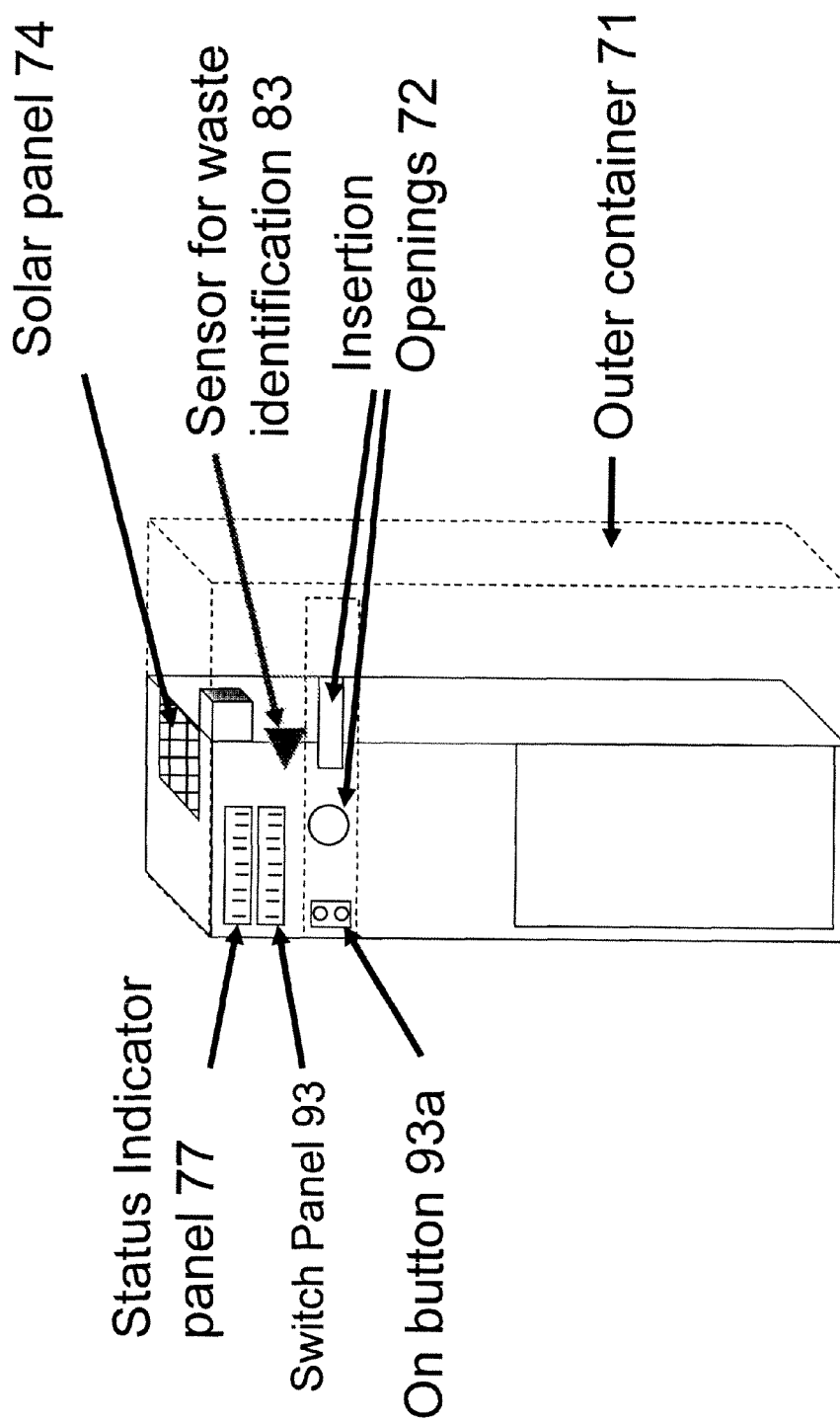

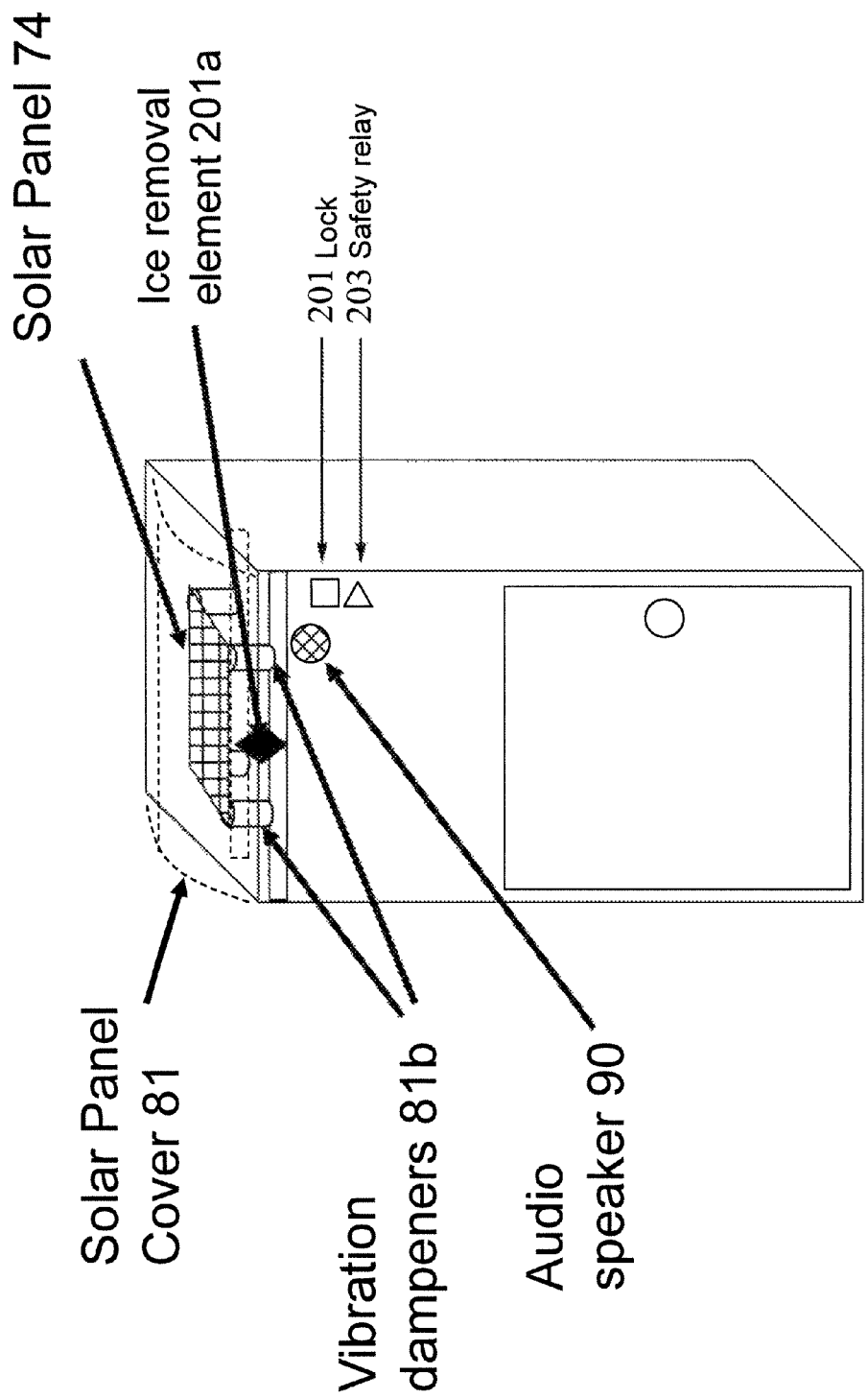

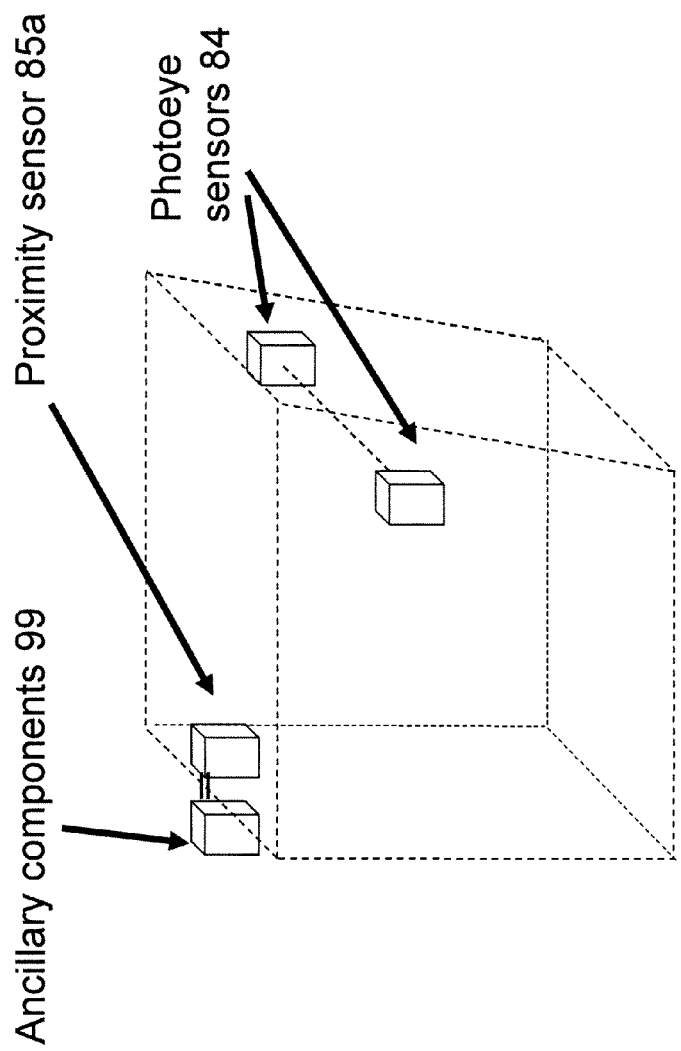

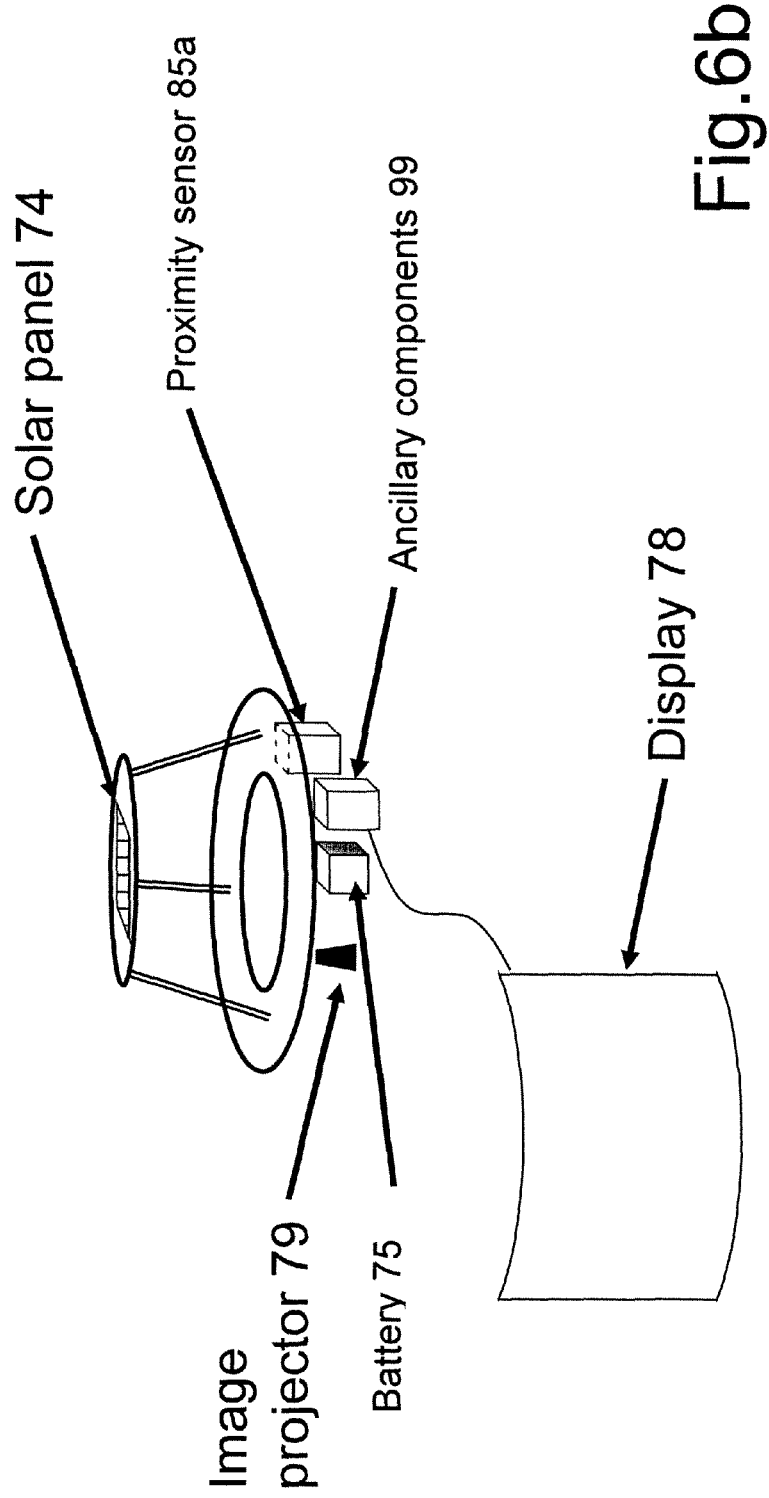

ELECTRICALLY-POWERED PROGRAMMABLE WASTE ENCLOSURE

RELATED APPLICATIONS

This application is a national stage application of PCT/US2011/044855, filed Jul. 21, 2011 which claims the benefit of priority under 35 U.S.C. §119(e) to U.S. Provisional Application Ser. No. 61/368,392, filed Jul. 28, 2010, the disclosures of which are incorporated herein in their entirety by reference.

FIELD OF THE INVENTION

This invention is directed towards a waste enclosure device ("device") comprising a waste enclosure employing operational functions including collection and monitoring capacity wherein said device includes one or more programmable logic controllers. Operational functions are activities performed by electrical components including sensors to determine waste deposits characteristics and contents. These operational functions are further adapted to send and receive data, optionally wirelessly, and configured and adapted to utilize solar derived electric power and, optionally, electric power from other sources.

BACKGROUND OF THE INVENTION

Waste enclosures are important items at any location where there are people depositing or collecting waste materials, to avoid the people having to carry materials with them, and to keep areas clean of litter. Often, these enclosures are used to deposit or collect trash or various types of recyclable materials. Cities and towns typically allow waste enclosures at locations such as street corners and high traffic areas. Convenience and accessibility increase use of such containers. Many commercial entities use large waste containers, also called Dumpsters, for aggregating larger volumes of waste or recyclable materials.

Waste containers require periodic emptying, typically by sanitation or recycling personnel. This entails that personnel spend time and equipment traveling, emptying and hauling waste from container locations. Often, the collection and transport activity occurs when containers are less than full. Such travel, cost, traffic, road wear, fuel consumption and public disturbance could be avoided with more efficient collection schemes. Additionally, identity or disposal characteristics of the waste material is not typically known until the waste collector visits the waste enclosure. At such time it is difficult or inefficient to plan routing of materials to their optimal locations, or to enable the efficient disposal/selling of recyclable material to buyers. Further, efficiencies may be increased if the public is instructed in how to deposit different items such as cans, bottles, aluminum, or paper properly.

Known waste enclosures either do not employ electricity, or require AC electricity. AC electricity limits such waste enclosures to locations on the electricity grid. Other known enclosures that use stored and/or solar electricity lack energy saving aspects that allow for reduced collection frequency through real time, on-site data, or use of the powered devices in poorly lit locations, or that extend the battery life of the energy storage system to reduce cost and travel frequency. Such deficiencies limit the location of such electricity-enabled waste enclosures or make collection from the enclosure more expensive. Thus, known waste enclosures are characteristically non-powered, or they are locatable only in areas where electrical connections are feasible or where natural light is plentiful and strong.

Solar energy is a clean source of power, and it enables the use of electrical power in remote locations where other forms of power are impractical and uneconomical. Solar energy is converted to electricity by a variety of systems. Systems include photovoltaic panels or collectors (PV devices) also termed solar cells, photovoltaics, or PV cells (Herein described as solar panels). Solar energy is also converted into electricity such as by concentrating solar power, where the sun's energy is focused to heat material, which then produces electricity. Often, it is impractical and uneconomical to connect grid power to a waste delivery container located even at a relatively close distance to an electricity source, for example, across the street from a retail establishment. In addition, in many cases, it is impractical to replace or recharge batteries.

There is a need for powered waste enclosures in remote settings and high-traffic areas, and in areas of poor light conditions, that will allow people to conveniently deposit or collect waste, but that provide other information for emptying the enclosures safely and only when needed or optimal. There is also a need for subsidy of waste collection operations.

SUMMARY OF THE INVENTION

With approximately "real-time" knowledge of waste enclosure "fullness," waste destination, weight information, collection information, on-site advertising characteristics, programmable waste enclosures disclosed herein save money by conserving staff time, and conserve fuel by reducing collection frequency and vehicle travel time.

The present invention uses stored energy to gather and send data about waste deposits and collections and provide for electronically powered advertising or announcements (collectively, "display" or ""displays"). These may be fee generating and may subsidize waste handling operations. In one embodiment, the stored energy is solar energy.

This device and method provides a low cost device and method for receiving and recognizing waste streams and characteristics (such as volume, density, material, supplier, brand, etc) and transmitting or receiving information to and from route planners and schedulers using stored energy, while providing power for displays. One embodiment of the present device and method is configured and adapted to collect solar energy, store said energy and, as needed, uses the stored energy to run sensors and other electrical devices to gather and distribute data and provide power for displays. Additionally, the stored power can be used to compact trash or recyclable materials, or shred or bale or otherwise process the materials.

In one embodiment, the solar collector is a photovoltaic (PV) apparatus connected to a storage device, such as a battery, capacitor or fuel cell. Mechanical means of energy storage include springs, pneumatic and hydraulic pressure, among others. Alternatively, charging batteries remotely from the electrical grid and replacing of discharged batteries with charged batteries is used to provide power.

In another embodiment, the device provides AC electricity to an AC-powered waste container by changing DC power from the Solar panel into AC electricity by means of an inverter. In another embodiment, power is used to pressurized air. Pneumatic power is then available to power certain system functions such as compaction or an electrical generator.

In yet another embodiment, the stored energy is used to power a waste compactor or shredder. In particular embodiments, the instant method and device combines a programmable logic controller, a power source, and sensors and transmitters to convey information about waste and user characteristics.

In an illustrative embodiment, the electronics of the container are enclosed in a compartment adjacent to one of the waste chambers. In this embodiment, interior compartments (other than the waste container aspect, and that through a safety system) are not directly accessible from the outside without an access limitation feature such as a lock and key. This is configured to reduce tampering and/or user injury.

The battery and electronics compartments are usefully sealed from water to protect the enclosed electronics from the elements. Furthermore, the battery compartment is usefully vented separately from the electronics and motor compartments. Venting the battery compartment allows hydrogen gas to escape safely. Hydrogen gas is known to be produced during charging of certain batteries. The solar panel is usefully protected from weather and vandalism by a covering. In a particular embodiment, this cover is constructed from durable plastic or a metal grate configured to permit light to reach the solar cells. In particular embodiments the solar panel cover employs reflective panels to direct light to a photovoltaic cell or solar thermal collector.

In a specific application, the waste insertion opening on the front panel of the outer container is monitored while waste is being deposited or after it has been deposited. A sensor in communication with an insertion opening senses waste deposits and communicates this data to the processor, which counts or otherwise measures waste material being delivered, along with time of delivery and other information, which may include material type, weight, depositor and recipient name, pin number, barcode information, etc. In a particular embodiment a camera or CCD or the like obtains an image of the depositor. Imaging is also performed at intervals not necessarily related to depositing of waste. Furthermore such camera or CCD activity is, in particular instances, remotely initiated, such as by staff at a distant location to see the container contents (inwardly-looking) or the environment external to the waste container (outwardly-looking). In particularly embodiments a given camera is configured to function for both outward and inward looking. Information is also gathered through a barcode scanner or RFID tag, scales, visual sensors, etc. The insertion opening is constructed generally to block users from reaching into the waste compartment and inserting or removing waste or becoming injured (a "lockout").

In one illustrative embodiment, the lockout is passive and does not require electrical energy to operate. In another embodiment, retrofitting an existing container is useful. A programmable logic controller, battery and other electronics are installed on an existing enclosure are retrofitted onto an existing dumpster or trashcan. In a noted embodiment, only authorized personnel (e.g., waste collection personnel) can access the waste chamber, the electronics chamber or both. An access opening is hingedly attached to allow the waste collection personnel to have unimpeded access to one or both enclosures. Yet another embodiment consists of several chambers, which are used for different purposes or types of materials. Internal shelves, guides, sensors and actuators can move wastes that are improperly deposited into their correct chambers.

In a further embodiment, data relayed to the processor from the insertion opening is gathered and relayed (continuously or intermittently) by a wireless transmitter to a designated recipient such as staff. Monitoring the usage of the container, and communicating such usage or other information to waste collection personnel, visits (staff, service, collection, repair etc) to the particular container are optimized and unneeded visits reduced. In particular embodiments, communication to or from a waste container are accomplished by wireless transmitter or receiver or by a physical indicator, such as an indicator lamp or pop up flag (e.g., observable by staff). In other embodiments, container use and waste contents information is collected by other means, such as internal scales, photo eye sensors, limit switches, or other sensors (broadly understood as "contents sensors"), without changing the nature of the device. This data saves time and money by allowing the collection personnel to schedule collections according to demand. In addition, data download to the device can allow real-time access to messaging display. In this embodiment, data is received by a Programmable Logic Controller (PLC) in the enclosure, to change settings or display specific messages on the receptacle. For example, an advertising agency could upload a new advertisement to the side of the enclosure, or the technical staff could upload new software to the enclosure so that it operates differently.

Stored power is also used to provide lighting. In one embodiment, the light assists in reading instructions either outside of the container or inside as is useful to service personnel. Other power applications include cameras, voice recognition systems (e.g., software, Dragon Naturally Speaking®) and voice operated instructions for the user, and lighting for advertising signage including scrolling signage. In this embodiment, the sensors monitoring the waste deposit opening engages the processor, which turns on other sensors, transmitters or receivers, by activating relays or other switching means, to engage the processor in functions like counting deposits or identifying the materials deposited. Intermittent use of energy reduces energy consumption by sensors and other electrical devices. Similarly, displays are optimally illuminated intermittently using low energy consumption lights such as LEDs, and may be turned on by pre-programmed criteria such as time of day, ambient light, by the use of the insertion opening, or by the motions of passersby which trigger a motion sensor, or when other electrical signals are detected by sensors.

Advantages of the present invention include a waste enclosure, which can be located in remote places such as those that do not have access to AC power. In particular embodiments, waste enclosures of the present invention require many fewer visits for emptying.

Noted is the control of dangerous situations constituting malicious users inserting explosives or infectious substances in a container. This invention employs programmable logic controllers attached to sensors to alert personnel or passersby to the danger.

In some embodiments such substance sensors include sensors for chemical, biological agent, or radioactivity (broadly "composition sensor(s)"). Particular embodiments use substance sensors to detect hazardous or illicit substances.

In addition, as some waste enclosures require payment to deposit, and yet others provide payment for deposit, the advent of solar-powered logic controllers, scanners and transmitters can enable payment options at the waste enclosure, providing greater user convenience.

Another advantage of the present invention is that information relayed to the container by staff is displayed to users or others in sight of the container.

Waste enclosures located in public areas generate advertising revenues. In some instances these are funds paid to the owners or operators of the enclosures and used to offset costs of the waste collection activities. The disclosed waste enclosure provides advertising space and electrical power needed to light signs, provide audio, download and upload new messages wirelessly, and power the programmable logic controller that is used to control the messages and functions and is configured to efficiently power the electrical functions of the invention.

Another advantage of the present invention is that displays are programmed to respond to user's presence, a "user sensor." In one embodiment, the user sensor includes facial recognition capability (e.g., Google's® Picasa® digital image organizer). Another advantage of programming the displays to respond to user's presence or use of the enclosure is that limiting displays in time and duration uses energy more efficiently.

Another advantage of the present invention is to have the processor detect light by sensing a threshold of current from the attached solar panel, rather than employing an additional light sensor. This arrangement conserves energy and cost. In particular embodiments, the PLC is configured to engage a wireless transmitter to send a warning message when PLC senses that battery is below a threshold or trending toward a critically diminished state.

Yet another advantage of the present invention is that, in certain embodiments, comprises voice recognition devices or provides audible messages to the user. Such capacity assists the user in understanding instructions, particularly if the user is visually impaired or can provide information to or interaction with remotely located staff.

Another advantage of the present invention is the incorporation of smart technology for speaker applications such that, for example, speaker volume would be higher in noisy environments such as a specific street corner at a particular time of day, while it would be set lower in quieter locations or times, or self-adjusting based on such factors as ambient noise.

In particular embodiments the voice module can is powered by the stored energy, activated by the user opening the insertion opening or by other means such as an "on" button or a scanner. In a particular configuration, volume of the speaker is adjustable. For example, the volume would be set higher in noisy street corners, while it would be set lower in an office building.

Specific embodiments are programmed to track voltage and battery performance over a period, and to send a message if the battery or sunlight are insufficient.

The present invention is also configurable to be retrofitted onto an existing enclosure such as a conventional trashcan or dumpster.

An embodiment that adds a programmable logic controller and sensors to an existing waste enclosure decreases the total cost of the added functionality in some instances and offers advantages disclosed herein.

In one configuration of the instant device, multiple insertion openings are provided. Specific openings are provided for different materials. This configuration assists in the separation of materials. To aid in the proper separation of materials, internal channels, grates, sensors and actuators can guide materials into their proper locations.

Another advantage of the present invention is that it is optimized to work more often during times of most usage or when more people are nearby.

Finally, since the battery provides power at night, the transmitter/receiver can send or receive long messages at night when cellular communications are cheaper.

BRIEF DESCRIPTION OF THE DRAWINGS

The foregoing and other features and advantages of the present invention will be more fully understood from the following detailed description of illustrative embodiments, taken in conjunction with the accompanying drawings in which:

FIG. 1 illustrates a waste enclosure with two insertion openings in the front panel of the outer container for two different materials, removal door and several internal and attached components.

FIG. 1c illustrates a variation of the waste enclosure showing an animal-resistant latch

FIG. 1e is a diagram of an image projector is located deep within a protective hole or inset, and shown in cross-section in the detail.

FIG. 2 shows a perspective sectional view of the present invention, waste chamber, and several internal components.

FIG. 3 is a perspective sectional view of several components.

FIG. 3a is a perspective view of several internal components.

FIG. 6 is a diagram of a retrofit kit for a traditional Dumpster.

FIG. 6b is a diagram of a retrofit kit for a traditional trash can lid.

DETAILED DESCRIPTION

Figure 1A:
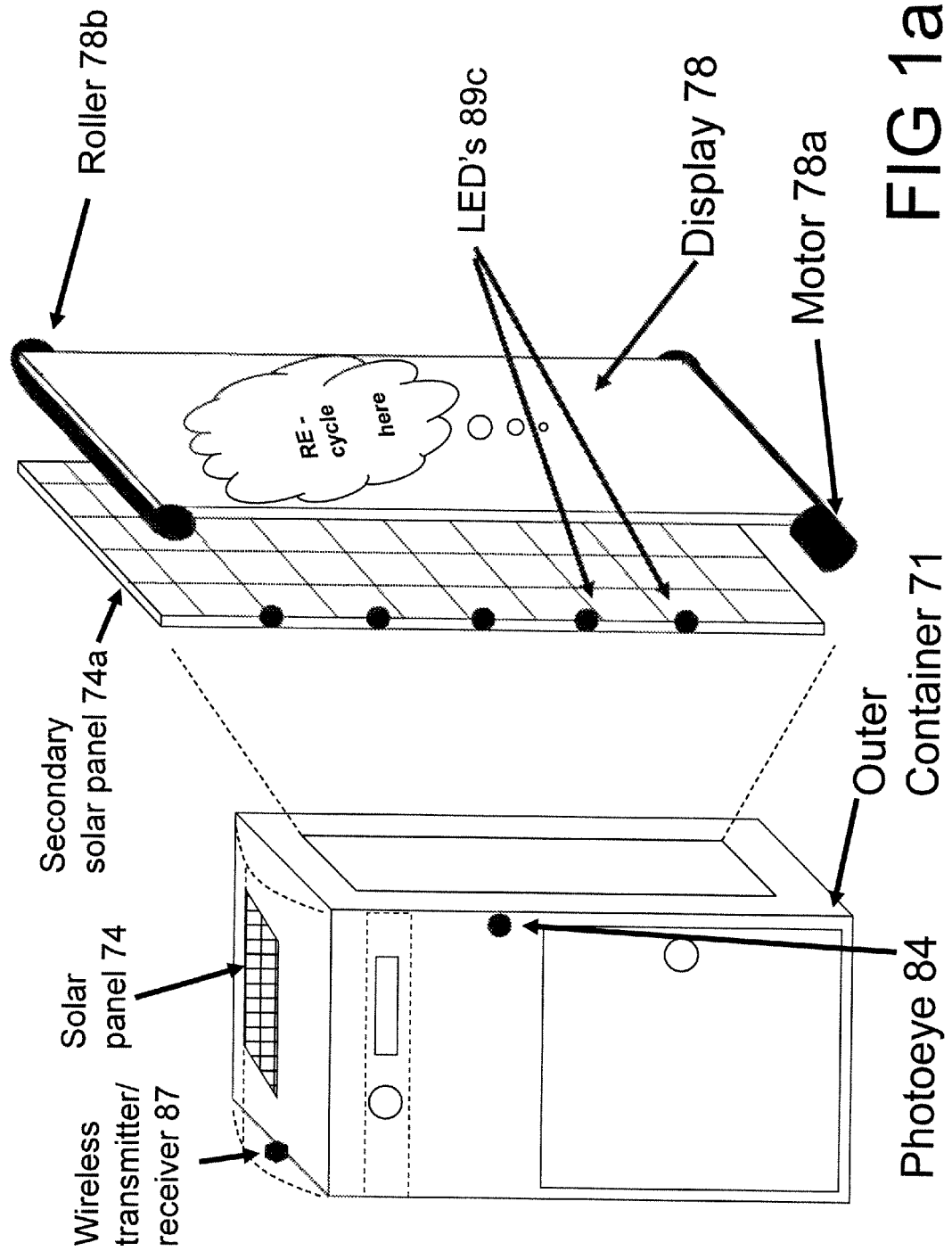
FIG. 1a illustrates a variation of the waste enclosure with an exploded view of a display panel with secondary solar panel located behind a translucent display.

The present invention discloses a system of waste deposit and collection in an enclosure including integrated battery storage and solar energy generation mechanism and a method for employing such. Further disclosed are embodiments wherein an integrated battery storage and solar energy generation mechanism and monitoring/communicating capability are provided to incorporate into existing conventional trash containers or other containers and dumpsters.

This invention will be better understood with reference to the following definitions.

A. Ancillary electrical components shall be broadly construed to include electrical devices associated with or forming part of the waste enclosure device of this invention exclusive of the PLC and the battery. Ancillary electrical components include a photovoltaic panel, sensors such as those useful to determine waste deposits characteristics and contents, components adapted to send and receive data, optionally wirelessly; other electrical devices to gather and distribute data and power for displays; a barcode and RFID scanners/readers, credit card reader, PIN number entry device, scales, visual sensors such as cameras, CCDs and ultrasound echo (sonographic) equipment, and fluoroscopy or x-ray equipment, MRI, data and lighted advertising or information displays, lights; voice, voice recognition, audio capability; proximity detectors, motion detectors, system status detectors such a locked-unlocked status, lock-unlock capability, door open-closed status, location, GPS, device orientation sensors, electromagnets, voltage status, ambient light detector, fire suppression actuators (such as for water $CO_2$, foam, halon, etc), advertising components such as electrically powered advertisement media, including but not limited to LED lights, LCD screens, motor/s to power scrolling signs, back-lit and side-lit lights to illuminate transparencies, lamps to power projections from a projector onto another surface, such as the sidewalk next to the device. These are, in some instances, associated with software and/or artificial intelligence software.

B. Switch panel shall be broadly construed to include electrical devices associated with or forming part of data entry devices. Switch panel includes buttons, switches, credit card readers, on/off controls, manual reset switch, and alphanumeric keypads. These are in some instances, associated with software and/or artificial intelligence software. Switch panel is included in the above "ancillary electrical components" definition.

C. Dynamic Power Management ("DPM") shall mean a processor configured and programmed to turn off or reduce energy consumption of ancillary electrical components: sensors, transmitters, receivers, etc. Typically, turn off is achieved through the use of relays or other switches. Reduced energy consumption is achieved through lowering power output to ancillary components, such as an LED lamp, by reducing current output to the components. Further, to achieve DPM, the processor is configured and programmed to disengage or de-power sections of the circuit board or slow processor speed when functions, like counting deposits, lighting signage or identifying the materials deposited when such functions are not required. Further, the processor may be configured to disengage all components when battery voltage is critically low. It is to be understood that disengagement may be hierarchically organized and programmed. DPM shall be broadly construed to include a processor configured to control and reduce energy use of electrically or physically-connected ancillary components or to control and reduce the energy use of components that are communicating wirelessly with the processor. DPM may be configured to automatically adjust power levels based on pre-set conditions, or it may be controlled by environmental factors, such as temperature or ambient light levels, or by variance of those factors, such as a change in temperature or light over a period of time, for example, two weeks. Of course, regular re-programming via the wireless receiver is contemplated.

FIG. 1 provides a perspective view detailing outer container 71, display panel 78, front panel of outer container insertion openings 72, waste removal door 73, showing the spatial relationship between the openings and compartments according to this embodiment of the present method and device. Scanner 80 is situated to scan items being deposited through front panel Insertion Opening 72. A solar panel 74 is mounted on top of the unit under a solar panel cover 81, both comprising part of the "roof" of the device or unit. In alternate embodiments, as described herein, the solar panel is electrically-connected by wires 74b (typically an electrical cable) and located apart from the enclosure, for example, on a pole or rooftop nearby, as shown in 74c, FIG. 3b. Status indicator panel 77 provides a display of information such as a system malfunction or an indication of bin capacity used and available or other notices, such as "low battery," "bin collected," "plastic materials present," device broken," or other messages. Display 78 shows instructions, announcements, or advertisements to the user or passersby. Image projector, 79, projects images onto nearby surfaces, such as the sidewalk. Image projector and Display may be activated and deactivated via the PLC 76 when the PLC detects the presence of passersby via the external proximity sensor 85a. In the pictured embodiment, solar panel 74 produces power for data logging, wireless data transmissions and intermittent lighted advertising shown on the display 78 and Image Projector 79, and for electrical operations carried out by ancillary components. In this embodiment, electrical operations are managed by a central PLC, 76.

FIG. 1a provides a perspective view detailing outer container 71, solar panel 74, and an exploded view of display panel 78, showing the motor for 78a a scrolling advertising panel. The motor is controlled by the PLC, which is programmed to intermittently scroll the advertisements based on a series of criteria. In this embodiment, the PLC is programmed to show transparent or translucent advertisements. These are particularly useful during daylight. A secondary solar panel 74a situated behind the advertising display collects additional sunlight. Also the motor 78a attached to the display 78, is configured to rotate the display when PLC 76 provides directs energy from the battery or other power source to the motor to rotate the motor. Multiple displays can be scrolled from a storage roller 78b. LED lamps 89c, are located to illuminate display 78 when ambient light is low and when PLC 76 determines that there is sufficient energy to illuminate LED lamps. The PLC is programmed to rotate ads printed on transparent or translucent materials that allow sunlight to pass through to the solar panels during the day. Alternatively, the PLC is configured to show a particular advertisement based upon operating instructions downloaded from a wireless receiver 87. In this embodiment, LEDs 89c are utilized on the side of the display, to provide illumination through the translucent area behind and around the advertisement. Furthermore, in this embodiment, the PLC is configured to determine, from the performance of the solar panels, whether it is dark or light outside, based on the energy output of the solar panels 74 or 74a compared to a predetermined threshold level, enabling the PLC to utilize this data to determine whether to have a "printed on" translucent sign showing, or whether to have the LED lamps on, and furthermore, how much energy to provide to the LED lights based on ambient light conditions. Additionally, in this embodiment, instructions may be downloaded to the PLC 76 to show certain advertisements at certain times, such as dinner advertisement at about 5:00 p.m. or a breakfast advertisement at about 7:00 a.m. Also in this embodiment, the PLC is programmed to upload data from the Photo eye 84 indicating the level of waste in the enclosure when the volume of waste reaches a threshold level. Photo eye, 84, FIG. 2, is located on the side panel above the Waste Material Chamber 87.

Figure 1B:
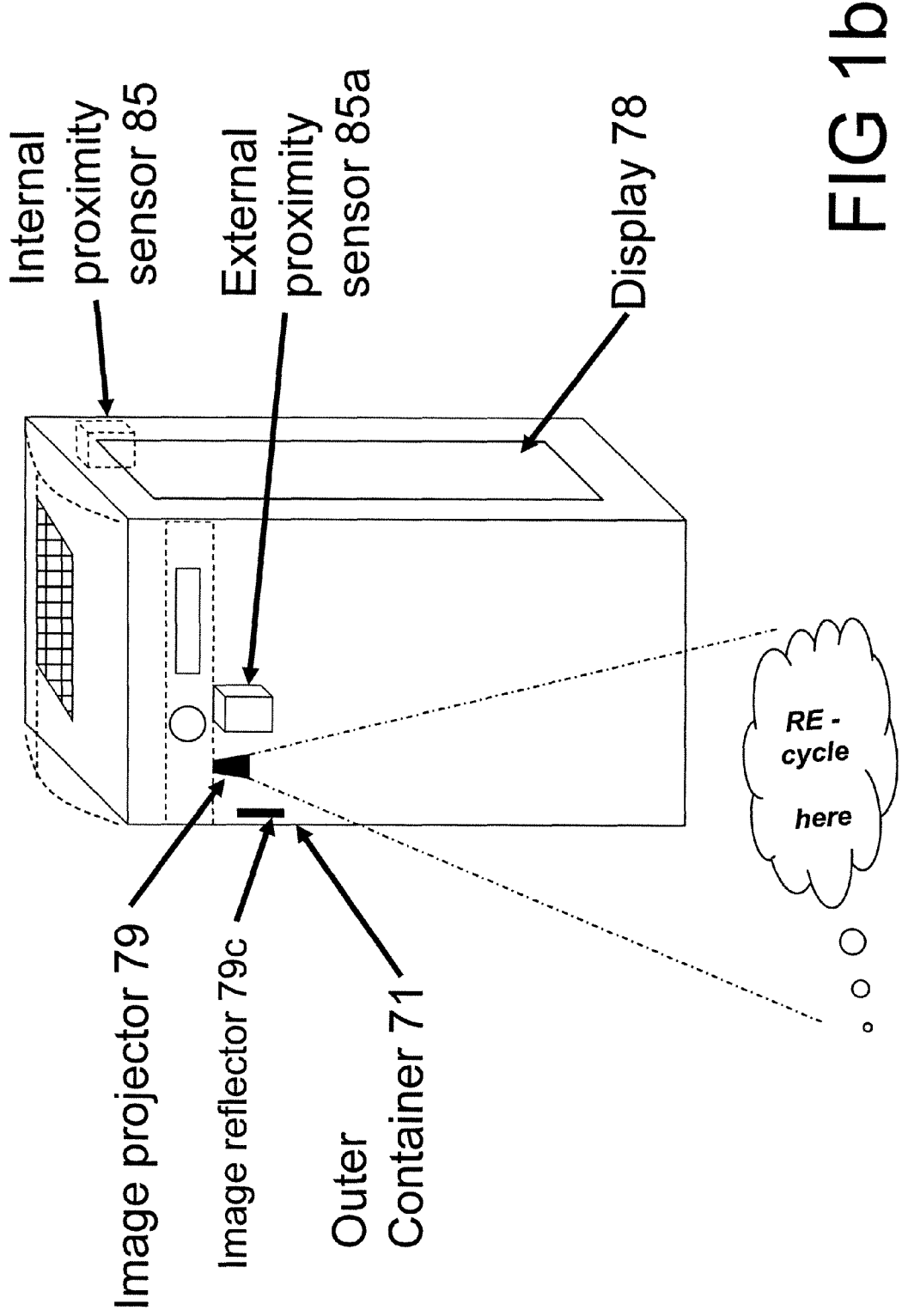
FIG. 1b illustrates a variation of the waste enclosure with an external proximity sensor, image projector and display.

FIG. 1b provides a perspective view detailing image projector 79 and external proximity sensor 85a. In this embodiment, the PLC is programmed to display operational instructions, here being to energize the image projector or display 78 when a passerby is detected by the external proximity sensor 85a. In one embodiment, the PLC is configured to rotate the projected image so that it is readable by the passerby. In this embodiment, it is programmed to rotate the image so that it is inverted when passersby approach from opposite directions. It is also programmed such that the image precedes or follows the passerby for a distance. Image reflector 79c may be utilized to reduce space constraints and to improve vandal resistance of the image projector. In an alternate embodiment, the image projector is located deep within a protective hole or inset, as shown in cross-section detail in FIG. 1e. Internal proximity sensor 85 is used to detect the volume of waste inside the outer container 71, instead of photo eyes.

FIG. 1c provides a perspective view illustrating an animal resistant latch. Animal resistant cover 215 is designed to be easily and intuitively usable by humans, but difficult for animals such as bears, raccoons and squirrels to operate. In this embodiment, there is a finger-actuated locking mechanism 215a.

Figure 1D:
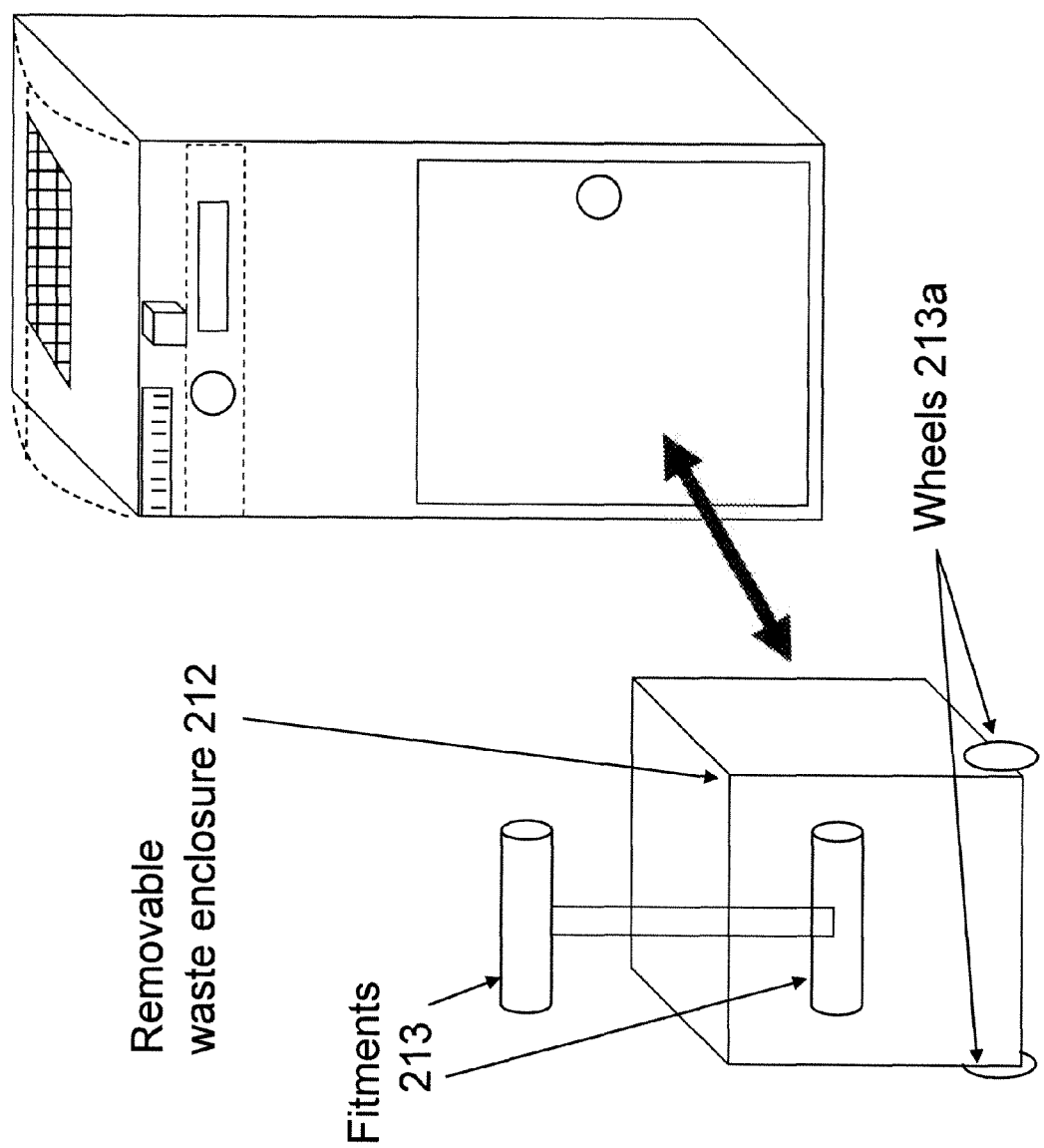
FIG. 1d illustrates a fitment, which enables standard automated lifts to attach to a removable bin within the waste enclosure (bin with fitment shown to the left of the enclosure).

FIG. 1d illustrates a removable bin with a fitment 213 for a truck hoist. In this embodiment, wheels 213a are shown to reduce friction when pulling or pushing the load. Wheels and a lifting apparatus helps in many situations where waste can become inconveniently heavy, therefore, requiring special removal devices to aid the workers.

The battery 75, shown in FIG. 2, provides power even when there is no sunlight. The photovoltaic cells 74 are electrically connected to the battery, which stores power to drive the sensors and PLC 76 and scanner 80 and sensor for insert opening 79a. A waste material chamber (87) is seen within in the outer container 71 partially in phantom, FIG. 2. Front panel insertion openings 72, FIG. 1, are shaped to prompt users to deposit the correct materials (i.e. round hole for bottles and cans, rectangular hole for paper). In this embodiment, Hall Effect sensor 79b senses usage. Electronics area 81a contains most of the electronics and protects them from damage and water. Photoeye, 84, is located below most of the ancillary electronics, and is located above the waste material chamber 87 so that it may detect waste levels just above the bin, where trash level can be sensed immediately after bin is full. In alternate embodiments, internal proximity sensor 85, FIG. 2 is used to detect bin fullness before the waste has filled the bin.

FIG. 3 front panel insertion openings 72 act to control use. In some embodiments, they prevent unauthorized insertion of materials. In one embodiment, an insertion opening lock 201, FIG. 3a, is opened when the lock 201 receives a message from PLC 76. In this embodiment, PLC sends a message to open or unlock the insertion opening when it receives input from a Scanner 80, FIGS. 2, 4. This input is given when, for example, a piece of waste with the appropriate material type (i.e. aluminum) is inserted. In an alternate embodiment, the lock is disengaged when a valid Bar Code, RFID tag, credit card, secret code or PIN number or other identification symbol enters data in the switch panel 93. In an alternative embodiment, the device is turned on when the front panel insertion opening 72 is opened or when the ON Button in the switch panel 93a is pressed. In an alternative embodiment, the insertion opening is automatically opened or unlocked when a valid material type or permitted RFID tag, bar code, PIN number, credit card swipe, or other identifier is scanned by a scanner, 80, FIGS. 2, 4. In an alternate embodiment, the insertion opening is automatically opened when a user with a wireless technology used for exchanging data over short distances (using short length radio waves e.g., Bluetooth™-enabled phone) or handheld computer communicates with the waste enclosure. Other such methods of communicating data from user to machine and machine to user when waste is deposited are contemplated in the practice of this invention.

Figure 3B:
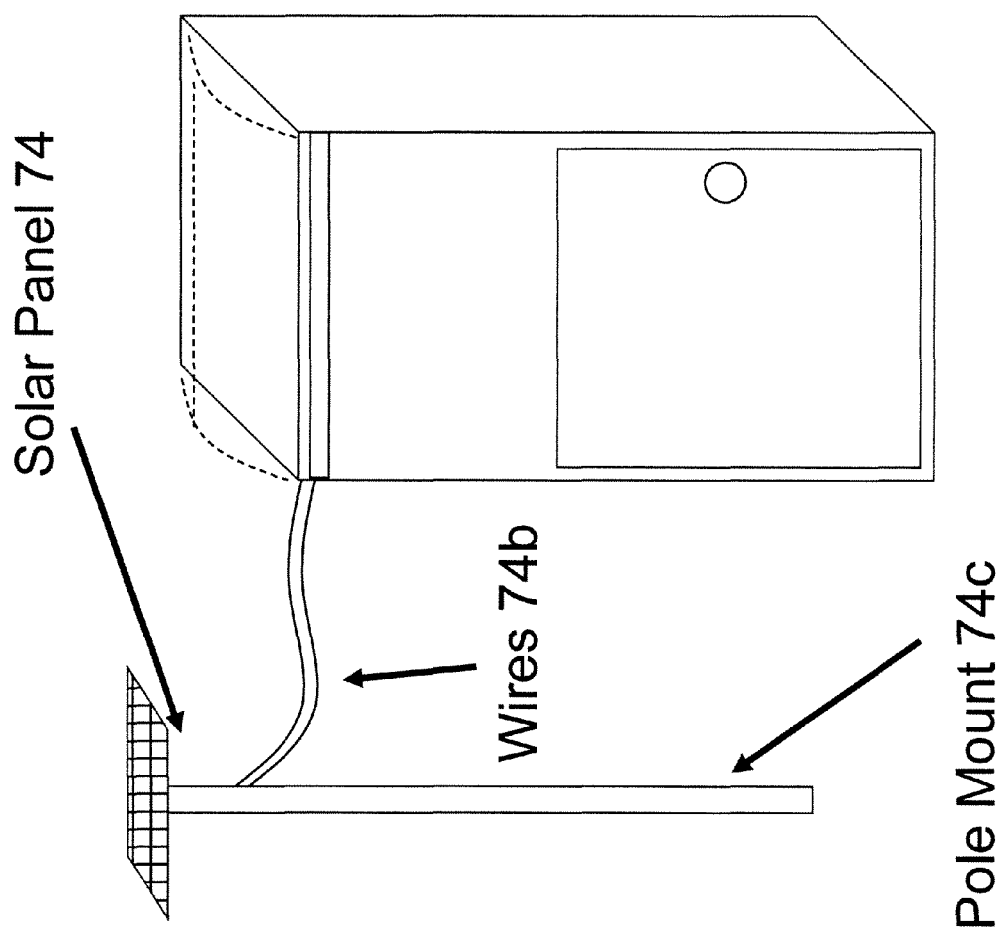
FIG. 3b is a diagram of the PV as situated outside of, but in electrical connection with, the container or enclosure.

More details are provided with the illustrative embodiment shown in FIG. 3a. An audio speaker 90 is shown on the front panel. The solar panel 74 is positioned for maximum sunlight exposure, typically on top of the device. Solar panel 74 may also be placed in other locations ("offset"). As offset the solar panel can be placed on sides of the device to increase exposure to the sun when the sun is lower on the horizon or when the container is placed in a location with a roof overhead, or alternatively, the PV may reside outside of, but in electrical connection with, the container as shown in FIG. 3b, which shows the PV 74 and connector wires 74b and Pole Mount 74c. The solar panel may be located inside the outer container 71, and the outer cover may be constructed to allow sunlight into the protected area where the PV resides. The solar panel may otherwise be mounted outside the outer container and placed in a less readily accessible place, such as a nearby building wall, or up on a pole, as shown in FIG. 3b, and thus be less susceptible to vandalism, negligent operators, the elements, and animals. The solar panel 74 may be placed on an angle to prevent it from being covered by snow or debris. Further, the angle may be used to increase sunlight exposure based on azimuth of the sun across the sky. For example, a solar panel can be arranged to receive the most southern exposure (in the northern hemisphere) during the day. Alternatively, the solar panel 74 (or a reflector) may be pivotally mounted and powered to rotate and track sunlight. In reference to a solar power generating system, exposed to light shall be understood to mean that light energy directly or indirectly generates electricity through the solar power generating system (e.g., by photo-electric effect or heating). It is contemplated that, in addition to offset solar collection, virtually the entire exterior of the container can be fashioned of photovoltaic or solar energy gathering material to maximize energy production.

Solar panel 74 is usefully placed between vibration dampening features such as foam, 81b in FIG. 3a, to absorb shock in the event that the machine is bumped or tipped. Additionally, there can be a curved and/or angled plastic, such as a polycarbonate resin thermoplastic PV Cell Array Cover 81. (e.g., Lexan®, SABIC Innovative Plastics) in the form of a panel or layers over solar panel 74 to protect solar panel 74 from vandals or negligent use. Solar panel 74 can be covered by a curved PV Cell Array Cover 81, FIG. 1. that can be replaced. Additionally, the plastic panel layers shed water and snow.

Figure 4:
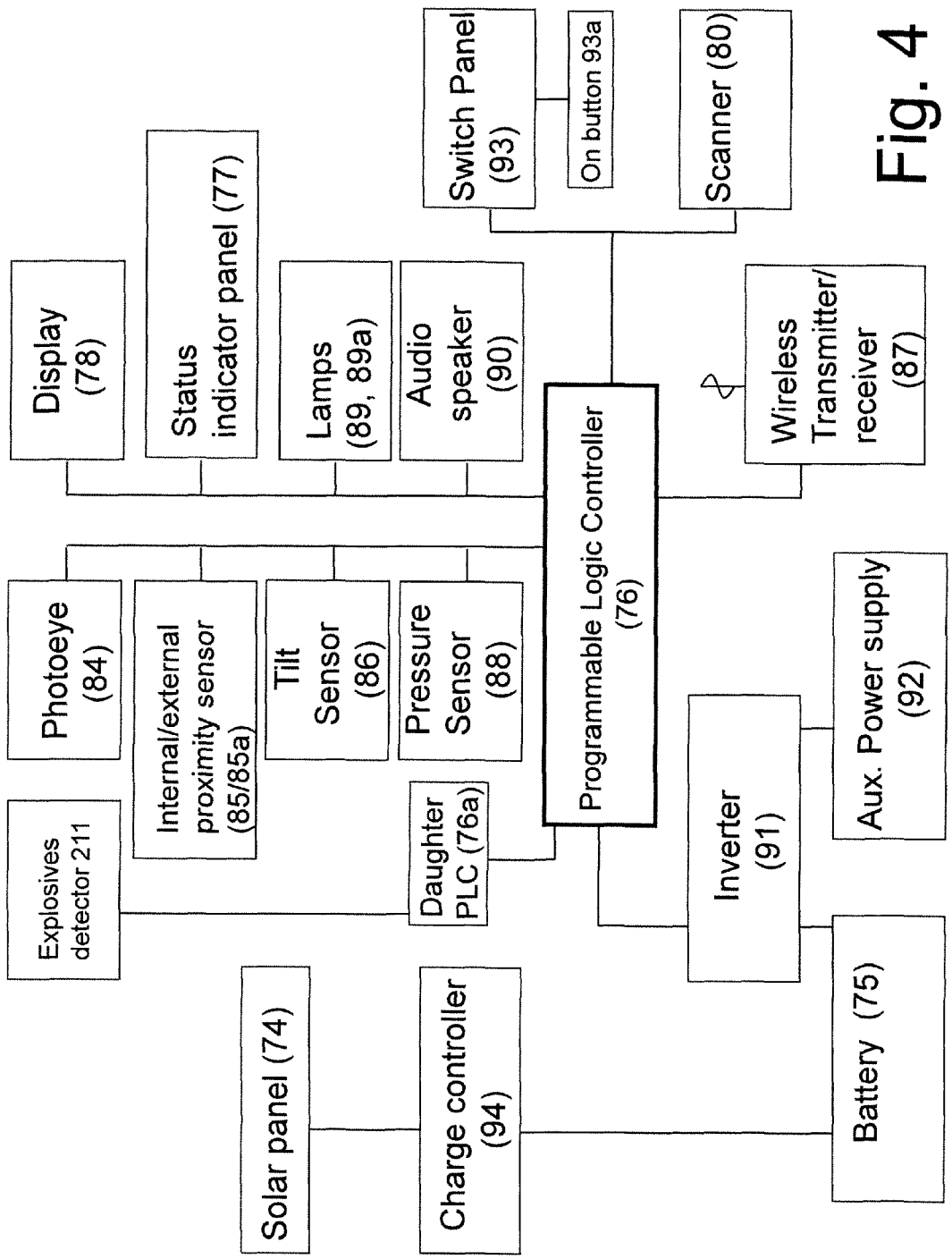
FIG. 4 is a schematic of one embodiment of an electrical system.

Storage battery or batteries 75, FIGS. 2, 4 can be upsized or downsized for different climates, energy demands, or for or auxiliary functions, such as providing AC electricity through an inverter. The battery or batteries may also be located separately from the container 71 and electrically connected to the PLC. Alternate embodiments do not have PV panels and batteries, but are instead powered directly by the usual energy grid with AC power, and AC energy consumption is managed by PLC 76, which operates and disables sensors and auxiliary electrical functions to save energy. As noted, electronics area 81a is designed to be substantially weatherproof. Electronic components to be located within electronics area 81a include a PLC, battery charging controller, user interface, audio speaker, and sensors, as will be described below. The access opening to the electronics area 81a is provided with a lock 201. When access opening to the electronics area 81a is unlocked, the battery 75 will automatically disengage by mean of safety relay 203, which is usefully configured to be fault-tolerant and non-energy consuming in its normal state (i.e. "off" in default mode, but turned "on" by the PLC 76 when functions are being performed and door is locked).

In an illustrative embodiment, a deep cycle battery 75 is employed to drive photo eye or limit switch sensors for insertion opening 72, FIG. 1 and sensor for waste identification 83, FIG. 3, which sense the presence or absence of the materials, and other important characteristics. Particularly noted is battery 75 being a "deep-cycle" battery designed to be regularly discharged to most of its capacity. Battery 75 may also be used to power sensors for insert opening 79a at insertion opening 72 said sensors usefully capable of user or waste identification. Internal proximity sensor 85, FIG. 2, measures level of waste inside the waste chamber. PLC 76 controls electricity to sensors and scanners to efficiently use energy from the storage system 75. PLC may be configured to specifically monitor changes ("trends") over a period of time. Measurement of trends is useful because usage and environmental factors are constantly changing. For example, in the northern hemisphere from October to December the amount of available light will diminish until December 21$^{st}$. Configuring the PLC to monitor battery voltage over several weeks and to compare the battery voltage in one week versus the week prior is useful. If battery voltage is going down week after week, the battery could be in danger of becoming "critically diminished." In other words, the battery voltage could fall to below 11-12 volts. At this low voltage, the battery can suffer permanent damage. In addition, functions of the device may become impossible to support (i.e. a data transmission) if voltage drops below the 11-12 volt range. In one trending embodiment, the PLC is configured to monitor the battery level, ambient temperature and the sunlight levels over a time period such as one week. Then the PLC compares such levels to the previous time periods (e.g., the previous one or two weeks). Such calculation identifies battery trends. Based on a downward trend, prophylactic action (i.e. reducing the energy load by eliminating some functions) is taken in advance of the battery reaching a critically diminished state.

Figure 5:
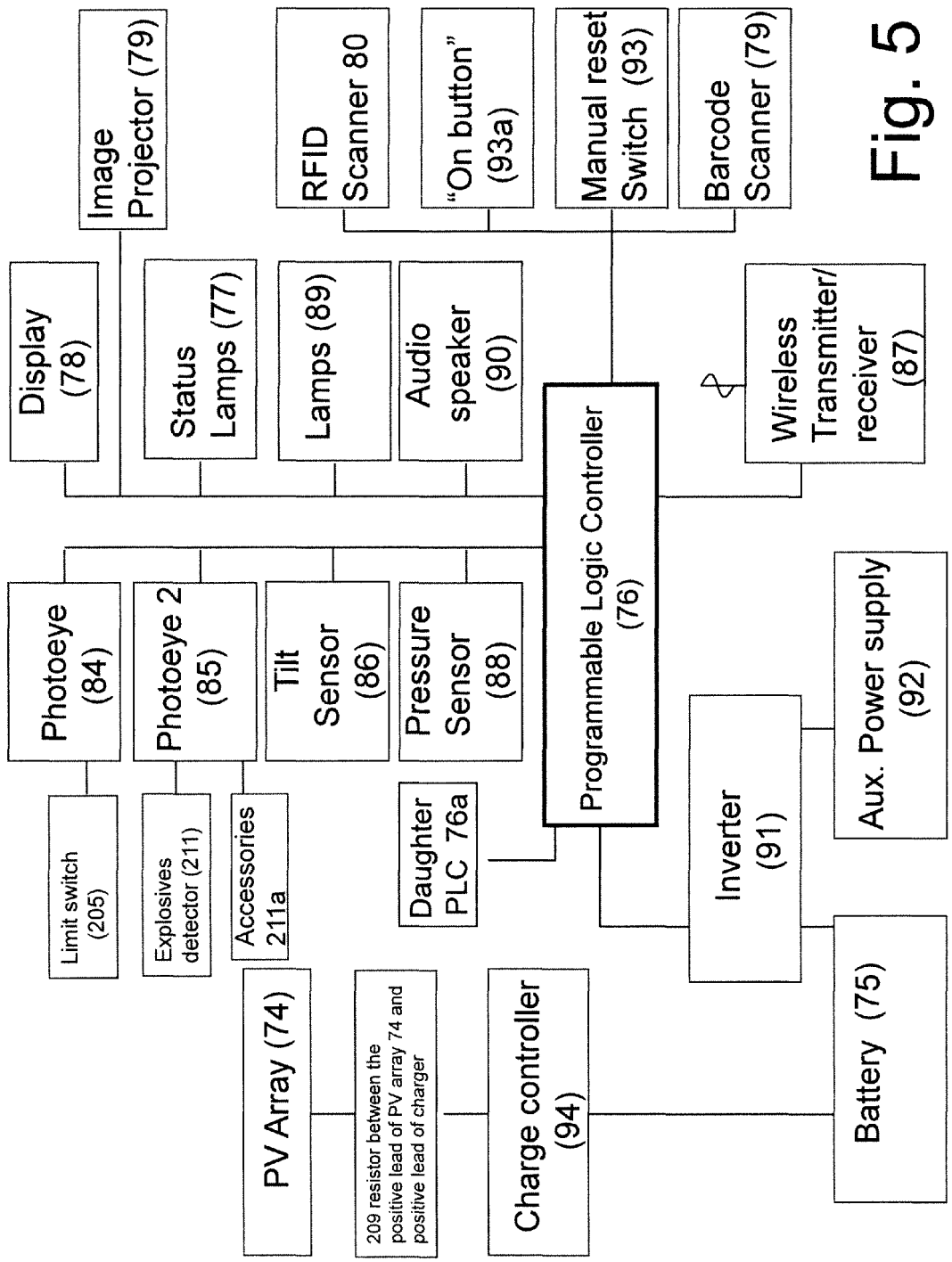
FIG. 5 is a schematic of an embodiment with augmented functions.

A control apparatus for an illustrative embodiment is shown in FIG. 4. The programmable logic controller 76 is a central microprocessor, which is capable of managing all operations, detecting all inputs and providing outputs for running the device. It is also capable of controlling power to the photo eyes/proximity sensors 84 and 85, by relays or contactors, (mechanical or solid-state) or other switching means. In different embodiments, photo eyes are used in place of limit switches or vice versa, without changing the nature of the present invention. A tilt-sensor 86 is usefully located above the waste material chamber 87, FIG. 2, and is actuated when, for example, the device is vandalized or tipped by a car or accident, or when the device is collected by a "front-loader" truck and tipped or jostled in handling. Photo eyes/proximity sensors, 84 and 85, are turned on when PLC 76 senses that the Insert Opening has been used, or alternatively when the On Button 93a in switch panel 93 has been pressed or when the scanner, 80, is engaged, or when the receiver 87 senses the presence of a handheld computer configured to communicate data with the PLC. Activation is programmed thus to save energy when no materials are present, and to reduce energy consumed by sensing objects unnecessarily. When turned on, in one embodiment, the photo eyes or limit switch sensors will determine whether materials block the light rays between this photo-eye sensor and a reflector on the opposite side of the channel above the waste chamber or when the limit switches 205 FIG. 5 are pressed. The photo-eyes signal the programmable logic controller (PLC) 76 when waste blocks the light beam for a measured amount of time, indicating that a particular quantity of waste is present. When sufficient waste is present, a message will be sent by the wireless transmitter/receiver 87, FIG. 4 connected to the PLC 76 as shown schematically in FIG. 4. Other sensors may be used to detect the number of uses of the insertion opening 72 in FIG. 1 or the scanner 80 in FIG. 4.

Pressure sensors 88, FIG. 4, may be used along with or instead of photo eye sensors, and alternatively are used to sense waste presence, absence or inventory levels. Alternatively, an internal proximity sensor 85 may be used to detect waste. Tilt Sensor 86, can transmit a message to PLC 76 if the device has been vandalized, stolen or tipped over. Display 78, FIG. 5 is used to display messages to users. Image projector 79, FIG. 5, is turned on when passersby are in the vicinity of the device, as detected by external proximity sensor 85a. In this embodiment, the PLC intermittently connects the proximity sensor to the power source, to sense passersby at regular intervals. For example, the proximity sensor would be turned on for 0.5 seconds every five seconds. This would reduce power consumption to the proximity sensor by a factor of ten, compared to continuous sensing. Of course other intervals are contemplated. These images shown by the projector or display may be transmitted to the PLC 76 from the wireless transmitter/receiver or may be programmed into the PLC manually by service personnel. Also in FIG. 4, in addition to a display, Status Indicators 77 are used to convey messages including but not limited to "on," "low battery," "collected," and "broken." Also, an Audio Speaker 90 in FIGS. 3a and 4 may be used to convey messages. Programming the PLC 76 will enable Audio levels to be controlled by staff on site or remotely via the transmitter 87. When PLC is not being used, it may be put to "sleep," a low energy mode, and reengaged by a Daughter PLC 76a that responds to inputs. When in operating mode, the PLC 76 uses more energy than in "sleep mode."

As seen in FIG. 4, solar panel 74 is connected to a charge controller, which controls charging to the battery 75. An inverter 91 is connected to the battery to provide auxiliary power through a supply port 92 or power to AC devices, as diagrammed schematically in FIG. 4. Finally, there is a manual reset switch 94 connected to the PLC 76 in FIG. 4. The manual reset can be actuated remotely through use of the transmitter 87, FIG. 4.

In this embodiment, the projected solar panel output is 30-Watts Peak, and generates up to about 90 Watt-hours of energy per day, given an average of 3 hours of full sunlight available per day. Sunlight energy is collected by the solar panel 74 and is converted by the charge controller 94, into a battery charging current and voltage. Battery reserve is approximately 800 Watt-hours, and each data transmission will use approximately $\frac{1}{5}^{th}$ Watt-hours. Thus, the energy reserve in the illustrative embodiment is enough to run up to 4,000 message transmission cycles. When large data sets are transmitted, such as when a graphic or photograph is downloaded to the device, fewer data transmissions are possible. Therefore, the PLC is able to adjust energy usage to match energy generation and energy storage over time, by reducing the frequency of un-prioritized operations. Optionally, in some situations, instead of charging from the solar panel, batteries are charged off-site and swapped into the device as needed. In these instances, slightly larger batteries than described above are useful. The controller is programmed to permit data transmission cycles, audio and other functions and lighting such that downtime and battery over-discharge and thus battery damage are avoided. The controller is also programmed to sense a battery losing capacity and to send a data transmission to personnel before the battery loses all power in advance of failure.

A feature of another illustrative embodiment is that the PLC 76, when in charging mode, is a maximum power tracker, regulating the charging of the battery from the solar panel. The power tracker has the ability to vary the level of voltage and amperage based on the characteristics of the solar panel, the sunlight level and the battery condition. The power tracker has the ability to balance current and voltage inputs to optimize battery 75 charging. The PLC 76 has the ability to optimize the charging regimen of the battery 75, by tracking the level of photovoltaic energy available and the battery charge and use of the device. When the battery 75 is fully discharged, the controller 76 will output low voltage and high amperage. When the battery 75 is almost completely charged, the controller 76 will output a higher voltage and lower current. When the battery 75 is fully charged, the controller will not output any charge to the battery 75, or will simply output a trickle charge. In addition, the controller is configured to output higher voltage when temperatures are low, and lower voltage when in hot weather. Thus, the battery will avoid being over-discharged when it is cold and more susceptible to failure and damage. A temperature sensor shown schematically as 76b, FIG. 5, informs the PLC 76, which is programmed to regulate charge current according to temperature-controlled thresholds. The PLC may also control lighting and the frequency of operations of ancillary components based on temperature data. In this embodiment, the nominal 12 Volt battery will be maintained at 13-14 Volts in cold weather (i.e. about 10 to 40° F.; −12 to 5° C.), and 12V-12.5 Volts in hotter weather (i.e. about 80 to 90° F., 27-32° C.). Conversely, when the battery 75 is undercharged, the controller 76 delays or skips a data logging or transmission event or limits lighting or audio levels until adequate charge is attained or until a new battery is installed. This serves to extend battery life and avert battery or operational failure.

This PLC 76 directed duty cycle is usefully determined by low power timing circuitry contained in a section of the PLC, or in the "daughter PLC" 76a, FIG. 5. Said circuitry governs the rate of energy usage by the ancillary components by turning components on, off or initiating low-power modes at regular intervals. The circuitry regularly initiates functions carried out by the ancillary components, and the time lag between functions is programmed in the PLC to adjust to battery voltage levels, or is modifiable on the unit, or is programmable by means of a wireless communication device or by electrical connection between the programming device (i.e. computer) and the PLC 76, or by configuring the PLC to adjust power levels automatically based on environmental information such as temperature, light levels or noise levels. In some embodiments the controller 76 includes data logging to gather usage history for analysis or transmission.

Table 1 provides specifications for a system in accordance with one embodiment of the present invention.

TABLE 1

Physical Specs of Unit
Size of Compartment

| | |
|---|---|
| Height of outer container | 48.00 inches |
| Height of Insertion opening | 2-6 inches |
| Width of solar array | 20.00 inches |
| Length of solar array | 20.00 inches |

Certain embodiments may include additional controlling components. For example, a secondary controlling component, herein shown schematically as Daughter PLC 76a in FIG. 4, is programmed to reduce or increase the clock speed (processor speed) of the primary processor is usefully implemented to save energy. Logic of the controlling component slows the clock speed when no functions are being run. During a period of high use, the clock speed of the PLC 76 is increased so that data transmission or sensor monitoring occurs quickly and accurately. Failure to slow clock speed of the PLC after high-energy use results in wasted energy, and failure to increase clock speed results in waste streams being missed or miscounted, or data transmission time lengthened thus increasing airtime costs and transmitter energy use. A microcontroller, such as a PIC processor, is usefully used in conjunction with PLC 76. As noted, a Daughter PLC 76a may be configured to increase the clock speed of the main PLC 76, as shown schematically in FIG. 4. The Daughter PLC may be configured to speed up the primary processor when it receives a signal that the system is being used from Scanner 80, from transmitter 87, from the insertion opening sensor 79a, or by other sensors that indicate system usage. Alternately, the Daughter PLC may activate the primary PLC when it senses a potential user is nearby. In this case, the external proximity sensor 85a senses proximity of a passerby. During data transmission and sensor activation, a typical PLC processor operates at approximately 4 MHz. Otherwise it operates at approximately 32 KHz. Of course other clock speeds are contemplated.

Other components that may be turned on for only limited periods are sensors such as pressure sensor 88 and scanner 80 that are on only as they need to gather the required data. Certain sensors, such as photo eye/proximity sensor, are turned on for minimum periods, for example up to 0.05 seconds, to respond reliably to the input signal while not consuming more energy than needed. This saves energy because the sensors consume energy only when they are on, provided that their normal state is off. Also, most data gathering events can be processed quickly, so very low duty cycles can be achieved with this innovation. Logs may be stored in hard drive memory and sent by the wireless transmitter to staff. These logs may be uploaded wirelessly to a central server so status information to users via cell phone or email or SMS (text message) can be relayed.

Another point of energy saving control is an insertion-opening sensor configured to engage photo-eye sensor 84 or scanner 80 when pressure sensor 88 responds to waste as deposited, rather than checking at intervals, or continuously, or on another basis. The PLC is programmed to trigger photo eye sensor 84 and scanner 80 after insertion-opening 72 has been opened or pressure sensor activated. In this embodiment, there is a transducer 79b, FIG. 2, such as an inductive sensor or pressure transducer or Hall Effect sensor, located on insertion opening 72 to allow for a signal to be sent to the controlling component indicating each usage.

In a specific embodiment, the controlling component is programmed to shut down unused circuits within PLC 76 or other circuits such as those in FIGS. 4 and 5 when any are unneeded. Specifically, the controlling component is programmed to disable certain sections of the circuit board, thereby turning off electricity to the waste and user sensors, Display and projector when the external proximity sensor detects no passersby. The PLC is programmed to turn the ancillary components on when users are present. This intermittent use of ancillary components saves energy. Certain areas of the controlling component may be activated or deactivated according to different methods. In certain embodiments, the activation of discrete controlling components is implemented through a MOSFET component, a relay or through different pins on the processor directly for areas of the circuit with lower current requirement. By intermittently monitoring and turning off circuits of the controller when those circuits are not required for operation, the device conserves energy.

Another embodiment includes a controlling component, a PLC, programmed to regulate the battery charger to eliminate battery charger energy consumption when solar power is insufficient for charging. The PLC is programmed to actively monitor wattage from the solar panel and to turn off the controller when the wattage drops below a threshold voltage. The battery charger is turned on when adequate voltage on the panel is reached, and off when it is not. Since many battery chargers require some activation energy from the battery to begin the charging process, the controlling component is programmed to supply the activation energy when solar energy is available. Alternatively, a blocking diode is used to keep current from flowing from the battery to the battery charger. In such configuration, no energy is able to pass from the battery 75 to the battery charger; it is only able to come from the solar panel 74 when it has sufficient voltage to charge the battery.

The battery charger typically requires activation energy to charge the battery. Without this activation energy, it blocks any current from going through the charger to the battery. By placing a resistor 209 between the positive lead of solar panel 74 and positive lead of charger, solar panel 74 provides activation energy when there is sunlight reaching the solar panel 74. Once operating, the charger is the lower resistance path, so energy flows through the charger to the battery.

In one embodiment, a display 78 is incorporated. In particular configurations, the display is a lighted sign, a scrolling panel, or other display method exhibiting information or advertising, which may include sound. The display may be activated intermittently. The intermittent powering reduces the energy budget. In this embodiment, the intermittent-use feature may be used in controlling the lighting of the device. Cycling the lighting at very rapid duty cycles that are invisible to the human eye, energy can be conserved. In an alternative embodiment, the lighting may be pulse modulated at slower cycles, thereby conserving energy and permitting variations in the level of display illumination. In addition, the display is illuminated in segments. In a related embodiment, the display is programmed to be on only when a person passes by. This is accomplished by use of a proximity sensor 85*a*, which engages the light to turn on when a user is within a predetermined distance away from the container. In yet another embodiment, the display may be controllable via wireless receiver from a base location. For example, the base station may want to post an electronic message such as an advertisement or emergency message on each receptacle, for example, "evacuation route: head south," or a message that, for example, the waste will next be collected at 2 PM on Tuesday, or a bus schedule with real-time updates.

Another illustrative embodiment includes a PLC that is able to disengage energy draws when voltage is low. For example, in many settings, the device powers displays as discussed above. The PLC is programmed to disengage these displays from the electricity source (e.g., battery 75) when the voltage is low.

In some embodiments, it is useful to employ a PLC to disengage electricity to the motors of a scrolling display when voltage is insufficient to power the display's motors. The PLC-powered a relay to connect electricity to a display comprising signage with a motor 78*a*, FIG. 1, only when there is sufficient voltage to power said motor. Additionally, the PLC can be programmed to power the sign's motors only when the information to be displayed is likely to be beneficial. For example, a restaurant advertisement might be usefully displayed at lunch hour (and not at other times). In addition, such a sign can be programmed to scroll the sign at greater intervals if power is insufficient to do so more often. In addition, the PLC can be programmed to rotate or change the Display for different audiences and times of day, for example to advertise a Café before breakfast and a restaurant before dinner.

Another embodiment includes a PLC programmed to search for a particular source of energy. In a device that is intermittently connected to the power grid, for example, the PLC is programmed to default to solar power source unless the device is connected to the grid. When connected in, the unit's energy-storing capability absorbs large fluctuations in energy use, which lowers the peak current that the machine draws. This is advantageous because utility-supplied electricity charges may be based on both total draw and peak draw. In some embodiments, this programming reduces peaks, resulting in lower electricity costs. For a device that is, at times, charged by a utility-supplied electrical source, the PLC a real time clock program could usefully charge the battery during "off peak" times when electricity rates are lower. Alternatively, it may charge the battery when AC power is connected, and use photovoltaic energy when not plugged in. This may be accomplished with a PLC programmed to engage and disengage relays to connect a particular power source to a charging circuit or operating circuit. Alternatively, the relays may be wired to automatically provide activation energy to the relay with the highest energy.

An embodiment is usefully implemented in situations where devices are placed temporarily at a particular location that may or may not have access to sun light or to grid power. In other situations where the device is searching for the best source of energy, it may be programmed to use sunlight whenever there is sufficient sunlight and to use utility electricity when sunlight is not adequate to charge the battery. On PLC 76, program logic would direct using sunlight during the day, and utility power at night, if both are available all the time and the power demand were beyond that available from sunlight. Alternatively, when the battery is charged off-site and replaced periodically, the PLC 76 determines the optimal replacement frequency of the battery and displays that information on the display 78, the status indicator panel 77, or transmit the information wirelessly via transmitter/receiver 87.

A PLC and electronics that enable recharging of the energy storage system by another source, such as from power provided by a collection truck, are implemented in an additional embodiment contemplated. Also contemplated as another source of power is one utilizing ambient radio waves. Use of ambient radio waves as a power source is further set forth in US Pat. Pub. No. 20050153754 "Magnetic field device" (Shanks et al.). These additional sources are particularly useful when devices are in storage or in transport regularly.

In another embodiment, multiple containers according to the embodiments described herein can be placed adjacent to one another. This could either be in a very busy location that requires more than one container, or in a location where different container types are suitable for different materials. In the one such embodiment, the multiple containers are electrically inter-connected so that data, stored energy and electrical components can be shared, thereby decreasing redundancy and cost.

Another embodiment includes a PLC programmed to track solar derived voltage over a period of time, and if voltage is falling, the PLC turns on an indicator (on the device or at a remote location) telling staff that the device or attached solar panel is placed in an unsatisfactory location or orientation and must be moved, or that the battery is failing and must be replaced. This is advantageous because there are often natural peaks and valleys in voltage that must be "averaged out" in order to determine if a location or cell/reflector orientation requires alteration. By monitoring voltage over three weeks, for example, cloudy weather lows and sunny weather highs are incorporated into a calculation for more accurate placement evaluation.

In yet another embodiment, the PLC is programmed to allow for a variety of settings controlled by the staff personnel. In this embodiment, the PLC receives a signal from a potentiometer, which is used to adjust the desired display lighting levels, voice volume, microphone sensitivity or other setting. In a related embodiment, these settings can be controlled wirelessly via the PLC, transmitter, and receiver.

Another embodiment incorporates a controlling component that is programmed to engage a relay to turn on a wireless transmitter when it needs to transmit a "full" or "malfunction" signal. The controlling component can also engage a relay to turn on the receiver, so that the PLC can have new information uploaded remotely by staff. The controlling component is programmed to disconnect the transmitter or receiver from the electrical system to save energy, after the data event. The electrical system is attached to the transmitter via relays so this disconnect is physically possible. In all such embodiments, disconnection can be achieved though input/output pins on the controlling component, without changing the nature of the electrical disconnect described in this invention.

Another embodiment includes bomb-sensing logic in the PLC. The PLC is programmed to engage a relay to turn on an explosives detector 211 when the machine is used (FIG. 5). The PLC is programmed to disconnect the detector from the electrical system to save energy, and the electrical system is attached to the detector via relays so this disconnect is physically possible. In this embodiment, the explosives detector is connected directly to the Daughter PLC 76a so that if malicious substances are detected, the main PLC can be removed from sleep mode immediately. The device may be outfitted with a camera that is activated by the opening of the insertion opening. The device may store a photo of everyone who deposits anything into the machine or of vandals who abuse the device (e.g., kicking, placing lit paper in the device). Picture storage may be by, for example a flash memory device. Photos may be wirelessly transmitted to a remote location, particularly if a sensor detects that the device suffered abuse.

In yet another embodiment, a tracking system, such as a global positioning system ("GPS") or other suitable tracking device is included, as shown as an "Accessory" schematically in FIG. 5, 211a.

The ability to locate a device provides theft recovery capability, quick logistical analysis, among its advantages. Such functions are also configured to be switched on and off by the PLC to reduce energy consumption.

Additionally, in another embodiment a PLC is programmed to engage a solenoid or other actuator which locks the insertion opening when the waste chamber is full. This reduces bin overflow/overfilling and provides security benefits.

In an additional embodiment, the device may include certain fitments 213 that allow for the automated removal of a removable waste enclosure FIG. 1b. The fitment may include a bar or a handle at certain height, or reinforcing ribs so that a mechanical hand can safely grab the removable bin without breaking it or causing to flex inward to such a degree that the waste streams inside are damaged or that they cannot be removed. Importantly, the sizing of the fitment and design of the interface between the bin and the lifting apparatus preferably matches the mating features of commonly used fitments on trucks. This typically includes a ledge and a bar at specific locations.

Another embodiment of the present invention provides for an animal-resistant device. This embodiment incorporates a latch that animals cannot operate, but that humans and handicapped humans can operate, 215, FIG. 1c. The rotating latch inhibits animals from entering the waste/collection chambers, including squirrels, rats, and humans. The latch need not be rotating, as there are other types of lathes that may be used, such as a pawl, a sliding lock, etc. In the event that an animal gains access to the compartments, all wiring is protected by metal or hard plastic to offer protection from animal damage.

Particular configurations of the device address keeping the solar collection capacity and device access undiminished by snow accumulation. These are characterized by curved or angled top side, by heat conservation or by heating elements. Heating elements are controlled to be activated when the battery 75 is near full charge. Further, heating, mechanical movements such as shaking or other snow dislodgement tactics (e.g., air compression/air blast elements, fans, pumps to remove liquids from inside the enclosure are placed above, beneath, near, or within the solar panel or underneath the mechanics of the insertion opening, in order to dispose of snow or ice that is covering the solar panel or clogging mechanical devices designed to allow materials to drop into the enclosure below, as shown positioned between the solar panel and the insertion opening, 201a, FIG. 3a. Sensors detect moisture, temperature, or a lack of light reaching the solar panel and activate the snow dislodgement elements. Curved and angled tops naturally shed snow and moisture without energy use.

In some configurations, the device includes placard attachment elements on the exterior to allow advertisement placards to be placed on the outside of the containers. Placard attachment elements are available in a variety of forms such as clips, corners, hook-and-loop fasteners (e.g., Velcro®), and magnets. Other features include wired or wireless communications equipment installed with the device, such as a transmitter, which is electrically connected to components mounted within the container or attached to the container. Radio or other wireless signals are transmitted by the device at specific points such as when the device waste container is full and no more deposits are possible, or if the device malfunctions or being vandalized. Further, the device can report on conditions including battery charge, cycle counts etc. The device also receives signals, including commands to immediately perform tasks such as changing or engaging the display or audio message. The device is also configured to report conditions by an indicator panel and by wireless transmitter, which indicates when the device is full or malfunctioning. Such indicator lights and methods allow the containers to be inspected from a distance (such as through binoculars or over the interne) to allow service personnel to determine whether it is necessary to make a service trip to the device.

Figure 6A:
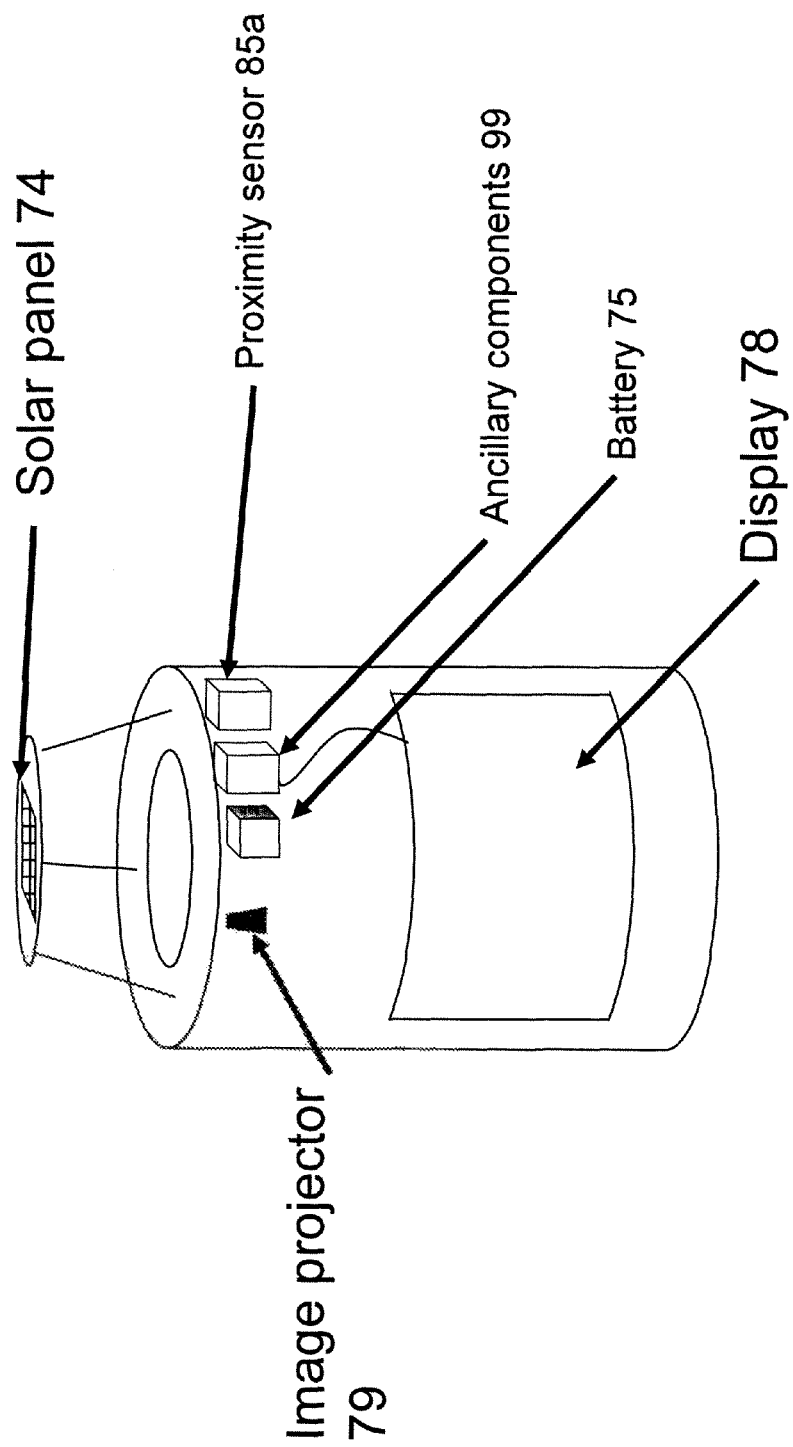
FIG. 6a is a diagram of a retrofit kit for a traditional trash can.

In other embodiments, the invention is mounted on a standard dumpster, as shown in FIG. 6, or a standard type of trash can, as shown in FIG. 6a, or on a standard trash can lid, as shown in FIG. 6b. In all such embodiments, the invention comprises ancillary components configured to gather, store and transmit data efficiently, and the PLC is configured to operate ancillary components intermittently. In such embodiments, the components can be mounted in a variety of ways without changing the nature of the invention. For example, the components can be bolted, riveted, welded, glued, cemented, stapled, taped or screwed to the enclosure, the components either mounted separately or within a single enclosure. The components may alternately be placed into cavities in the enclosure, molded into the enclosure, melted onto the enclosure, attached by Velcro™ or clamps, or held in place by other attachment means. The components may be mounted on, inside, or outside the enclosure, without changing the nature of the invention. In a particular embodiment for mounting the monitoring kit on a dumpster, shown in FIG. 6, a dual-sided enclosure is mounted onto the rear wall of the dumpster with clamps, so that no holes are required to mount the enclosures. In the front enclosure (the side of the enclosure that is mounted inside the dumpster cavity), a sonar sensor is mounted. The front enclosure is also shaped to be low-profile and smooth, so that trash does not get caught on the enclosure and block the sonar sensor, disabling it. In the rear enclosure, the PLC, battery, transmitter and other ancillary electrical components are mounted. A keyed lock is used to lock the two enclosures together, sandwiching the read wall of the dumpster between them. In one embodiment, the transmitter is located outside the dumpster cavity. In particular configurations, outside mounting improves data transmission, Along with solar power, the present invention contemplates other sources of power. This includes windmill or waterwheel electric generators or a compressor located proximate to the container, or located at an optimal location for collecting power. Alternatively, a human powered generator such as with a hand or foot crank or pump is positioned with the device, with instructions inviting users of the device to add human power such as crank the handle or pedal or pump to help store energy. Alternatively, the collection vehicle may recharge the energy storage mechanism. For such generators, whether by windmill, waterwheel or human, or heat-differential-powered, alternative energy generation means and energy storage means may be used, for example pumping air into a pressure tank for driving a pneumatic motor or piston, winding up a spring mechanism, or a pulley system, the present invention is configured to be energy efficient, to use energy intermittently to save power, and to be able to be run off of stored energy.

Along with the container, the present invention contemplates a server-based information storage system capable of receiving data from the enclosure. In one embodiment, the server is a programmable and searchable database which enables the user to display such information as average fullness, peak fullness, collection statistics derived over a period of time, such as collection efficiency, a measure of collections rendered versus collections actually required. It may also display statistics relating to waste handling cost, such as waste audits, which compare hauling charges to services rendered, industry benchmarks or comparative hauling charges if bin capacity or collection frequency were changed. It may display recommendations to reduce hauling costs by varying collection frequency or bin size. The server may also automatically consolidate information and relay said information to another server, such as a server located at a client site. In one embodiment, the information is uploaded directly to the accounting database of a client, so that the invoice paid to the collector can be automatically audited to ensure accuracy. In other embodiments, there is software code configured to determine useful statistics, such as optimal routes for collections or servicing each bin, the optimal configuration of bins of different volumes, so that optimal waste capacity and location of each bin on a collection route can be recommended, reducing wasted fuel and time stemming from collections rendered on bins that are not full. Such software may also include programs to track assets, such as trucks or dumpsters, using data mined from the database, which may be further informed by GPS tracking devices on each asset in a group.

Although the invention has been shown and described with respect to illustrative embodiments thereof, various other changes, omissions and additions in the form and detail thereof may be made therein without departing from the spirit and scope of the invention.

The invention claimed is:

1. A storage container comprising:
an enclosure;
a battery;
ancillary electrical components, the components powered by the battery, wherein at least one of the components is a contents sensor configured to sense contents within the enclosure; and
a controller electrically coupled with the ancillary electrical components and the battery, the controller configured to control operational functions performed by the ancillary electrical components, the operational functions comprising a sensing function performed by the contents sensor to sense the contents within the enclosure, wherein the controller is configured to disengage the contents sensor based on a triggering criteria.

2. The device of claim 1 wherein the ancillary components are configured to gather, store, transmit and receive data to the controller.

3. The device of claim 1, wherein an additional electrical component is a solar panel positionable to be exposed to sunlight, said solar panel electrically connected to said battery.

4. The device of claim 1 wherein the controller is configured to engage a wireless transmitter to send a warning message when the controller senses that battery is below a predetermined threshold.

5. The device of claim 1 wherein the controller is configured to engage a wireless receiver to receive operating instructions.

6. The device of claim 5 wherein the controller engages the receiver at predetermined intervals.

7. The device of claim 5 wherein configured to display a message when said wireless receiver receives display operational instructions.

8. The device of claim 1 wherein said photovoltaic panel is electrically-connected to said enclosure by means of an electrical cable.

9. The device of claim 1 further comprising electrical connection to at least one additional source of electrical power, wherein the controller is configured to select said storage battery as a source of energy when it is over a predetermined threshold voltage.

10. The device of claim 1 wherein said electrical components further include a voice recognition system.

11. The device of claim 1 wherein said electrical components further include a camera.

12. The device of claim 1 wherein the animal resistant cover for at least one of the front panel Insertion Openings is equipped with a lock.

13. The device of claim 1 wherein said electrical components further include an audio speaker.

14. The device of claim 1 wherein said electrical components further include a user sensor.

15. The device of claim 1 wherein said electrical components further include at least one display.

16. The storage container in claim 1, further comprising a camera coupled to the enclosure and facing an inside of the enclosure, the camera being configured to capture a filling level of the enclosure.

17. A storage container comprising:
an enclosure;
a photovoltaic panel, said photovoltaic panel positionable to be exposed to sunlight,
a storage battery within said enclosure and electrically connected to said photovoltaic panel;
a PLC, electrically connected to said storage battery, to monitor and control sensors and a transmitter/receiver, wherein said PLC is further configured to skip functions when a low battery condition is met by a predetermined standards;
electrical components connected to said PLC, said electrical components comprising sensors to detect items introduced into or present in said enclosure, said PLC further configured to actuate said transmitter to report information about materials in said enclosure.

18. The device in claim 17 wherein said PLC is configured to skip programmed functions based on predetermined priority of functions when said battery is below a predetermined threshold.

* * * * *